(12) United States Patent
Sawaoka

(10) Patent No.: US 7,117,081 B2
(45) Date of Patent: Oct. 3, 2006

(54) DIAGNOSIS FUNCTION EVALUATION SYSTEM FOR EVALUATING A FAULT DIAGNOSIS FUNCTION, COMPUTER PRODUCT, AND COMPUTER READABLE STORAGE MEDIUM

(75) Inventor: Hideo Sawaoka, Kariya (JP)

(73) Assignee: DENSO Corporation, Kariya (JP)

( * ) Notice: Subject to any disclaimer, the term of this patent is extended or adjusted under 35 U.S.C. 154(b) by 105 days.

(21) Appl. No.: 10/687,662

(22) Filed: Oct. 20, 2003

(65) Prior Publication Data

US 2004/0083071 A1    Apr. 29, 2004

(30) Foreign Application Priority Data

Oct. 18, 2002  (JP) ............................ 2002-304573

(51) Int. Cl.
G01M 15/04 (2006.01)
G01L 25/00 (2006.01)
(52) U.S. Cl. ..................... 701/114; 701/113
(58) Field of Classification Search ................ 701/102, 701/107, 114, 115, 31, 113; 73/116, 117.3, 73/118.1; 702/113
See application file for complete search history.

(56) References Cited

U.S. PATENT DOCUMENTS

| | | | |
|---|---|---|---|
| 5,968,108 A | 10/1999 | Takakura et al. ........... 701/102 |
| 6,125,322 A * | 9/2000 | Bischof et al. ............. 701/114 |
| 6,175,788 B1 * | 1/2001 | Hasegawa et al. ............ 701/29 |
| 6,577,934 B1 * | 6/2003 | Matsunaga et al. ........... 701/29 |
| 6,728,611 B1 * | 4/2004 | Kamiya ....................... 701/33 |
| 6,738,696 B1 * | 5/2004 | Oi ............................... 701/29 |

OTHER PUBLICATIONS

OBD II Diagnostic Tester, 2000 Actron Manufacturing Co.*
Modifications to Malfunction and Diagnostic System Requirements for 2004 and Sebsequent Model-Year Passenger Cars, Light-Duty Trucks, and Medium-Duty Vehicles and Engines (OBD 11) (see pp. 1 and 2), Section 1968.2, Title. 13, California Code Regulations, Staff's Suggested Modifications To Proposed Regulations, Apr. 25, 2002, pp. 1-24.

* cited by examiner

*Primary Examiner*—Stephen K. Cronin
*Assistant Examiner*—Johnny H. Hoang
(74) *Attorney, Agent, or Firm*—Nixon & Vanderhye P.C.

(57) ABSTRACT

An evaluation system for a fault diagnosis function has an engine ECU. The ECU is connected to an engine, sensors, and a MIL. The ECU diagnoses the sensors. The ECU also determines whether a diagnosis process of the diagnosis function for the sensors is completed. A memory stores a plurality of the completion result. When at least one of the diagnosis processes is completed in the last ten completion result, it is determined that the diagnosis function is in a normal condition. Otherwise, it is determined that the diagnosis function is in an abnormal condition, and the MIL indicates the abnormal condition.

27 Claims, 19 Drawing Sheets

US 7,117,081 B2

DIAGNOSIS FUNCTION EVALUATION SYSTEM FOR EVALUATING A FAULT DIAGNOSIS FUNCTION, COMPUTER PRODUCT, AND COMPUTER READABLE STORAGE MEDIUM

CROSS REFERENCE TO RELATED APPLICATION

This application is based on Japanese Patent Application No. 2002-304573 filed on Oct. 18, 2002, the contents of which are incorporated herein by reference.

BACKGROUND OF THE INVENTION

1. Field of the Invention

The present invention relates to an evaluation system for a fault diagnosis function for a vehicle, a computer program product, and computer readable storage medium.

2. Description of Related Art

A vehicle has a various kinds of equipments, such as sensors. The vehicle also has a fault diagnosis apparatus to automatically detect a status of the sensors. The status of the sensors includes a normal operating condition and an abnormal operating condition. The fault diagnosis apparatus has a main part in which a microcomputer is included.

Under normal conditions of the fault diagnosis apparatus, the fault diagnosis apparatus can detect the status of the sensors. However, if the fault diagnosis apparatus fails to operate as intended due to some reasons, the fault diagnosis apparatus cannot detect the status of the sensors. A regulation for the fault diagnosis apparatus is suggested by California Air Resources Board (CARB) in order to check a function of the fault diagnosis apparatus. The CARB published the regulation for onboard diagnostic systems (OBD II systems) that is "OBD II Malfunction and Diagnostic system Requirements" dated Apr. 24, 2002.

In the regulation, the function of the fault diagnosis apparatus is evaluated in an onboard condition. The regulation prescribes that an indicator lamp should illuminate a check result of the fault diagnosis. The regulation also defines a driving cycle. The driving cycle is a time period from a startup of an engine to a next startup of the engine.

FIG. 21 shows an example of an evaluation process. When the driving cycle ends, the evaluation process starts. In step 2000, it is determined whether a failure detection of the sensors by the fault diagnosis apparatus is completed or not. When the failure detection is completed, the diagnosis function is determined to be in a normal condition in step 2100.

However, in such a regulation, as shown in FIG. 22, when the failure detection is once completed, a flag "1" is stored in a memory. The flag "1" indicates a completion of the failure detection. While the flag "1" is stored in the memory, the diagnosis function is continuously determined to be in the normal condition. It is continued before the flag "1" is deleted, that is, a flag "0" is stored. The flag "0" indicates an incompletion of the failure detection.

The flag "1" can be deleted through the use of an external device. However, after that the failure detection is once completed, the flag "1" is stored in the memory. The diagnosis function is determined to be in the normal condition. The diagnosis function is again continuously determined to be in the normal condition. In such a situation, even if it is continue to be in a condition that the failure detection cannot be completed due to some reasons, the diagnosis function is determined to be in the normal condition.

SUMMARY OF THE INVENTION

The present invention therefore has an object to provide an evaluation system for a fault diagnosis function, a computer program product, and computer readable storage medium that determines a status of a fault diagnosis function as appropriate.

According to one aspect of the present invention, the evaluation system for a fault diagnosis function includes a completion status determination part and a diagnosis function evaluation part. The completion status determination part determines whether a diagnosis process of the diagnosis function is completed or not. The diagnosis function evaluation part determines that the fault diagnosis function is not in a normal condition when the diagnosis process is not completed during one of a predetermined number and a predetermined time period.

As a result, when the diagnosis process of the diagnosis function is continuously not completed, the diagnosis function is determined to not be in the normal condition. Therefore, the evaluation system determines a status of a fault diagnosis function as appropriate.

According to another aspect of the present invention, the evaluation system for a fault diagnosis function includes a ratio calculation part and a diagnosis function evaluation part. The ratio calculation part calculates a completion ratio or an incompletion ratio. The completion ratio is calculated based on the number of a completion of the diagnosis process within a predetermined number or a predetermined time period. The incompletion ratio is calculated based on the number of an incompletion of the diagnosis process within a predetermined number or a predetermined time period. The diagnosis function evaluation part evaluates the fault diagnosis function based on the completion ratio or the incompletion ratio.

According to another aspect of the present invention, the evaluation system for a fault diagnosis function includes a completion status determination part, a memory, a deletion part, a ratio calculation part, and a diagnosis function evaluation part. The memory stores a completion status relating to a diagnosis process of the diagnosis function. The completion status stored in the memory is deleted by the deletion part in response to a request signal from an external device. After that, the ratio calculation part calculates a completion ratio or an incompletion ratio. Then, the diagnosis function evaluation part evaluates the fault diagnosis function based on the completion ratio or the incompletion ratio.

According to another aspect of the present invention, the evaluation system for a fault diagnosis function includes a completion status determination part, a diagnosis function evaluation part, a memory, a manual operation detection part, and a deletion part. When the manual operation detection part detects a predetermined manual operation, a determination result stored in the memory is deleted by the deletion part. As a result, the determination result is deleted when the predetermined manual operation occurs, so that the evaluation system can determine a status of a fault diagnosis function as appropriate.

According to another aspect of the present invention, the evaluation system for a fault diagnosis function includes a completion status determination part, a diagnosis function evaluation part, a memory, a count part, a number determination part, and a deletion part. The memory stores a determination result of the diagnosis function evaluation part. The count part counts the number of a startup of an engine. When the number of the startup is outside a predetermined range, the deletion part deletes the determination result stored in the memory. As a result, the evaluation system can determine a status of the fault diagnosis function as appropriate.

According to another aspect of the present invention, the evaluation system for a fault diagnosis function includes a completion status determination part, a count part, a number determination part, and a diagnosis function evaluation part. The count part counts the number of a startup of an engine. When the number of the startup is outside a predetermined range, the diagnosis function evaluation part determines that the fault diagnosis function is not in a normal condition. As a result, the evaluation system can determine a status of the fault diagnosis function as appropriate.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Figure 1:
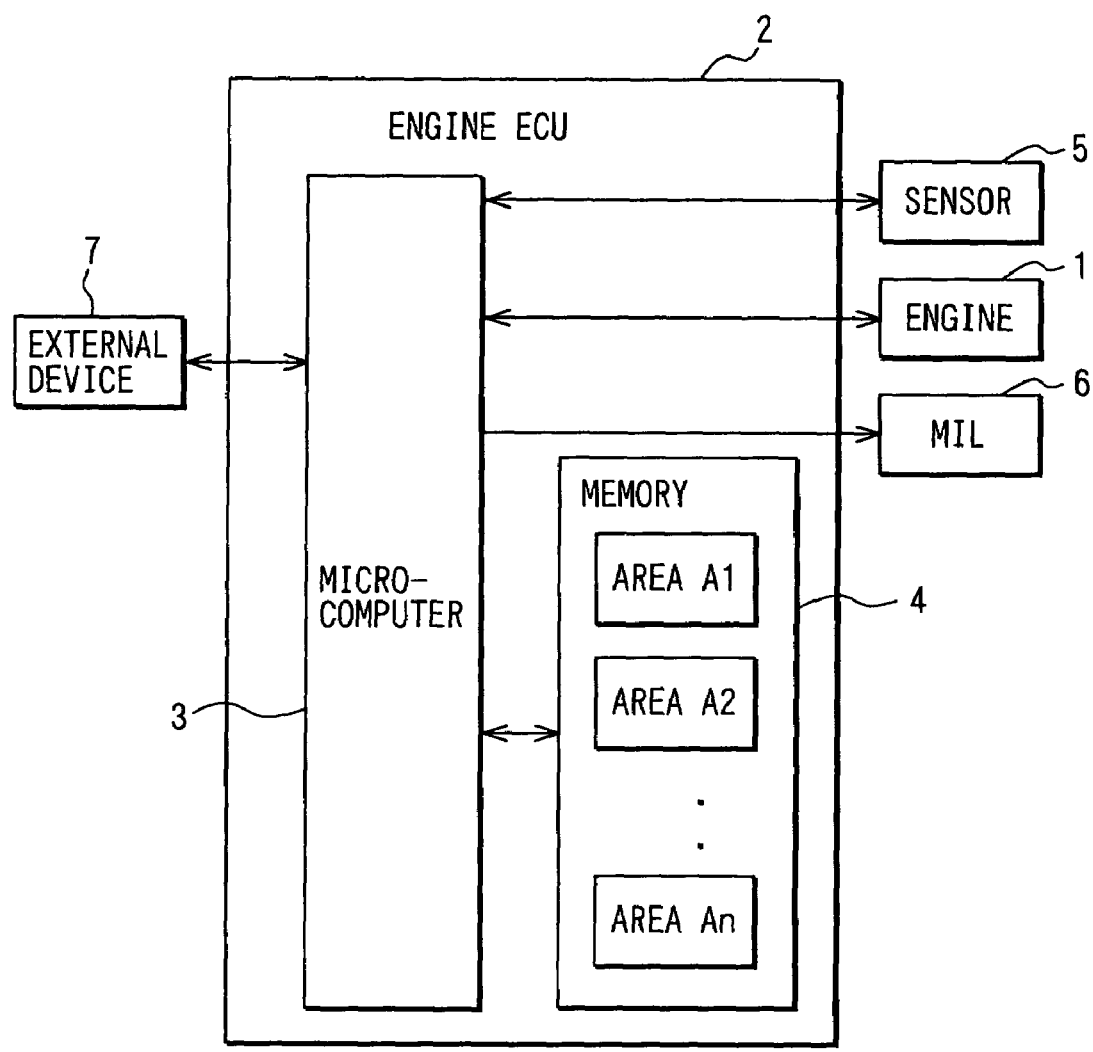
FIG. 1 is a block diagram showing an evaluation system for a fault diagnosis apparatus according to a first embodiment of the present invention.

The preferred embodiments of the present invention will be explained with reference to the accompanying drawings. In the drawing, the same numerals are used for the same components and devices.

[First Embodiment]

In the first embodiment, a fault diagnosis apparatus is determined whether a fault diagnosis function is in a normal condition or in an abnormal condition based on consecutive recent data. The consecutive recent data indicates a status of a check result of equipments, such as sensors. The status includes a completion and an incompletion of the check.

As shown in FIG. 1, a control system for the diagnosis apparatus has an electrical control unit (ECU) 2 for an engine 1 of a vehicle. The ECU 2 controls the engine 1. The ECU 2 functions as a failure diagnosis apparatus and a status determination apparatus. The failure diagnosis apparatus detects whether the equipments are abnormal. The status determination apparatus determines whether the failure diagnosis apparatus is in the normal condition or in the abnormal condition.

The ECU 2 has a microcomputer 3 and a memory 4. The microcomputer 3 is a well-known processor. The memory 4 stores data, such as check results of the failure diagnosis. The microcomputer 3 and the memory 4 are included in the diagnosis apparatus.

The microcomputer 3 is connected to the engine 1, peripheral equipments, and a multiple indicator lamp (MIL) 6. The peripheral equipments such as sensors 5, which are objects of the failure detection, are disposed around the engine 1. The MIL 6 indicates a check result of the failure detection. The microcomputer 3 is capable of connecting to an external device (external tool) 7 via a connection terminal, if necessary. For example, the external device 7 is connected to the microcomputer 3 at a certain place where vehicles are inspected, such as a gas station.

The memory 4 is an electronically erasable and programmable read only memory (EEPROM) or a static random access memory (SRAM). The EEPROM is a kind of a nonvolatile memory. The SRAM is a kind of a volatile memory. The memory 4 has a plurality of record areas A1–An, which are storage areas, to store a plurality (n times, e.g., 10 times) of status data. The status data indicate a completion or an incompletion of performing the failure diagnosis. A plurality of memories, each of which stores one of the status data, may be used instead of the memory 4.

Then, a basic operation of the status determination apparatus of the first embodiment will be explained.

The microcomputer 3 controls the peripheral equipments, such as sensors 5, and the MIL 6. The microcomputer 3 inputs signals from the sensors 5 and so on.

When the external device 7 is connected to the microcomputer 3, the microcomputer 3 performs transactions, such as outputs to the external device 7, in response to a various kinds of requirement signals outputted from the external device 7.

For example, when the external device 7 requests the microcomputer 3 to output the result of the failure detection of the sensors 5, the microcomputer 3 outputs the result of the failure detection to the external device 7. When the external device 7 requests the microcomputer 3 to delete the detection result, the status data are deleted from the record areas A1–An of the memory 4. As a result, a value "0" is set in every record area A1–An. The value "0" indicates the incompletion. The deletion request signal from the external device 7 is a request for deleting all of the detection result stored in the record areas A1–An.

In the first embodiment, when the failure diagnosis for the sensors 5 is carried out, a value "1" is stored in the record area A1 of the memory 4 if the failure diagnosis is completed. Otherwise, the value "0" is stored in the record area A1 if the failure diagnosis is not completed. This operation is repeated 10 times in a row. Each result of the completion or the incompletion is sequentially stored in the record areas A1–An. The series of the data stored in the record areas A1–An are updated to latest ten data when latest data is stored in the memory 4.

The failure detection is carried out to various kinds of items, such as an oxygen sensor, a fuel vapor system, an accidental fire condition, an exhaust gas recirculation (EGR) system, and a catalytic function. The oxygen sensor detects an oxygen concentration within exhaust gas. The fuel vapor system inspects a vapor condition of fuel from fuel tank.

Next, operations of the microcomputer 3 of the status determination apparatus will be explained.

1) Processes when the external device 7 requests.

Figure 2A:
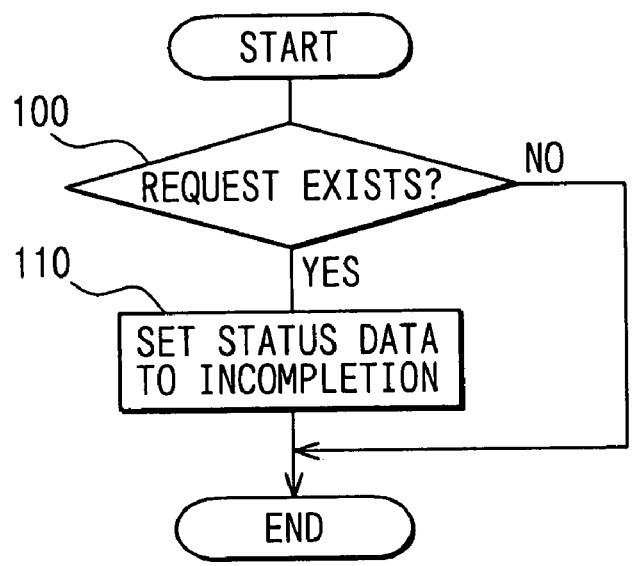
FIG. 2A is a flowchart showing a deletion process according to the first embodiment.

This section of the processes shows when the deletion request signal from the external device 7 is detected. As shown in FIG. 2A, in step 100, it is determined whether the deletion request signal for deleting a detection result exists or not. When the deletion request signal exists, the process proceeds to step 110. Otherwise, when the deletion request signal does not exist, the operation once ends.

In step 110, since the deletion request signal exists, all of the status data stored in the record areas A1–An are set to the incompletion. The status data indicates the completion or the incompletion of the inspection of the equipments, such as the sensors 5. Then, the operation once ends.

That is, in the process, when the deletion request signal for deleting the detection result exists, every status data "1" stored in the record areas A1–An is set to "0", which indicates the incompletion. As a result, all of the status data stored in the record areas A1–An are set to "0".

2) Processes when driving cycle is ended.

This section of the processes shows when the driving cycle is ended. The driving cycle is a predetermined time period from a previous startup of the engine to a current startup of the engine. That is, an end of the driving cycle corresponds to the current startup of the engine.

Figure 2B:
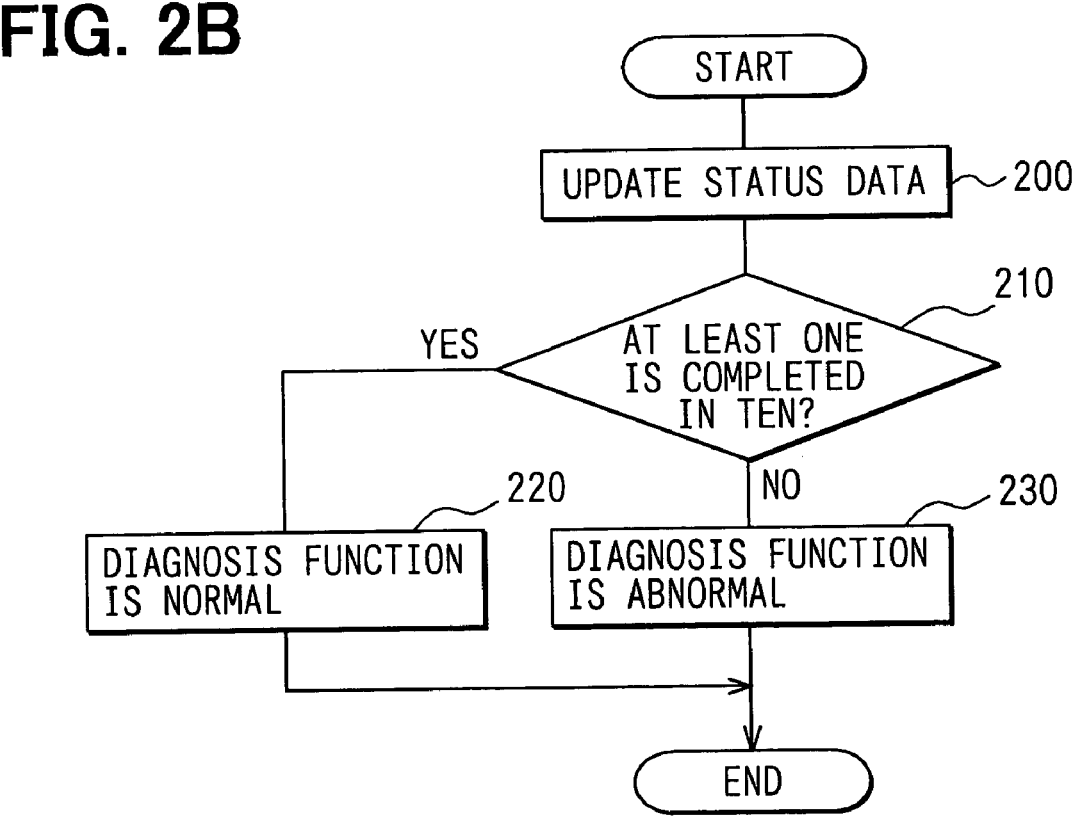
FIG. 2B is a flowchart showing an evaluation process according to the first embodiment.

As shown in FIG. 2B, in step 200, the status data are updated. The status data indicate the completion or the incompletion of the failure detection of the equipments, such as the sensors 5. In other words, the status data, which include latest ten data of the completion or the incompletion, are stored in the record areas A1–An.

In step 210, it is determined whether at least one of the failure detection of the equipments is completed in the latest ten data. When a judgment is determined to affirmative, the process proceeds to step 220. Otherwise, when the judgment is determined to negative, the process proceeds to step 230.

In step 220, since at least one time of the failure detection is completed within ten times of the detection, the diagnosis function is determined to be in the normal condition. The MIL 6 is activated to show the normal condition of the diagnosis function. For example, the MIL 6 is turned of f. Then, the operation once ends.

In step 230, since even one time of the failure detections is not completed within ten times of the detection, that is, all of the failure detection is not completed, the diagnosis function is determined to be in the abnormal condition. The MIL 6 is activated to show the abnormal condition of the diagnosis function. For example, the MIL 6 is turned on or linked. Then, the operation once ends.

As a result, in such an operation, it is determined whether the diagnosis function is in the normal condition or in the abnormal condition, and the condition is notified to a driver.

Next, effects of the failure diagnosis apparatus will be explained.

In the first embodiment, the status data, which indicate the completion or the incompletion of the failure detection of the sensors 5, are stored in the record areas A1–An. When at least one of the failure detection is completed within latest ten times of the detection, the diagnosis function is determined to be in the normal condition. On the contrary, when even one time of the failure detection is not completed, the diagnosis function is determined to be in the abnormal condition.

Figure 3:
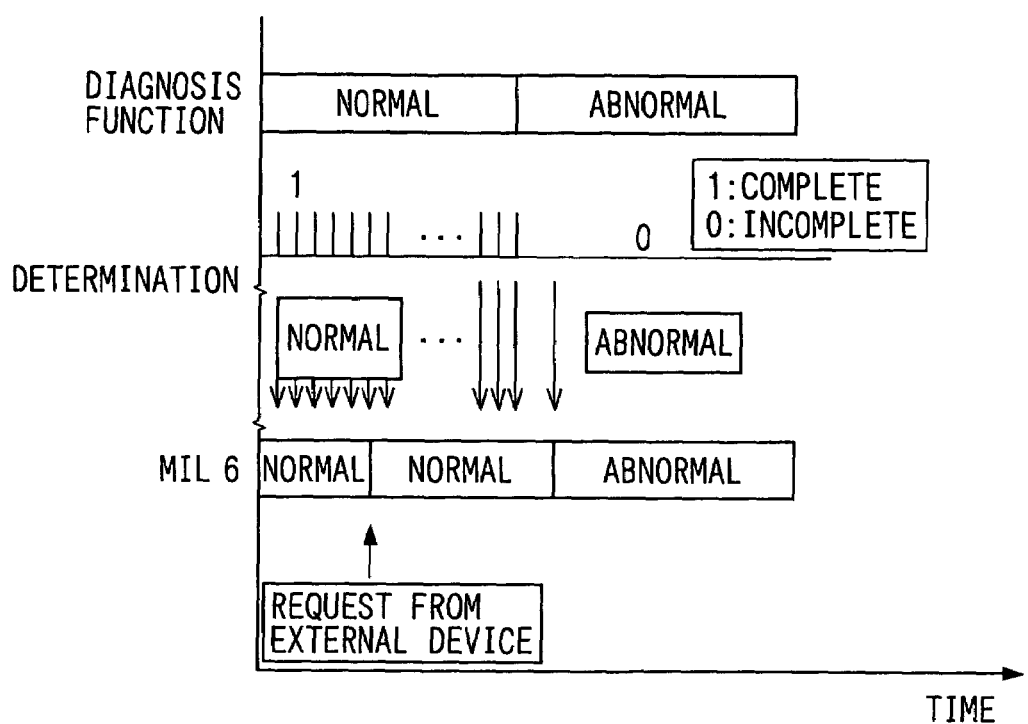
FIG. 3 is a timing chart of the evaluation system according to the first embodiment.

That is, as shown in FIG. 3, when at least one of the failure detection is completed within latest ten times of the detection, the diagnosis function is determined to be in the normal condition. Then, the MIL 6 shows the normal condition of the diagnosis function. On the contrary, when even one time of the failure detection is not completed, the diagnosis function is determined to be in the abnormal condition. Then, the MIL 6 shows the abnormal condition of the diagnosis function. Accordingly, it is not determined to be in the normal condition by mistake in spite of the abnormal condition or the incompletion of the failure detection.

In the related art, the diagnosis function is determined to be in the normal condition when the failure detection is once completed even when the failure detection is not completed in a row. However, the first embodiment of the present invention does not determine as the related art. Therefore, the first embodiment can determine the status of the diagnosis function as appropriate.

In the first embodiment, the diagnosis function is determined to be in the abnormal condition when the failure detection is not completed ten times in a row. However, the continuity may be not required. The diagnosis function may be determined to be in the abnormal condition when the failure detection is not completed within a predetermined time period.

[Second Embodiment]

Figure 4:
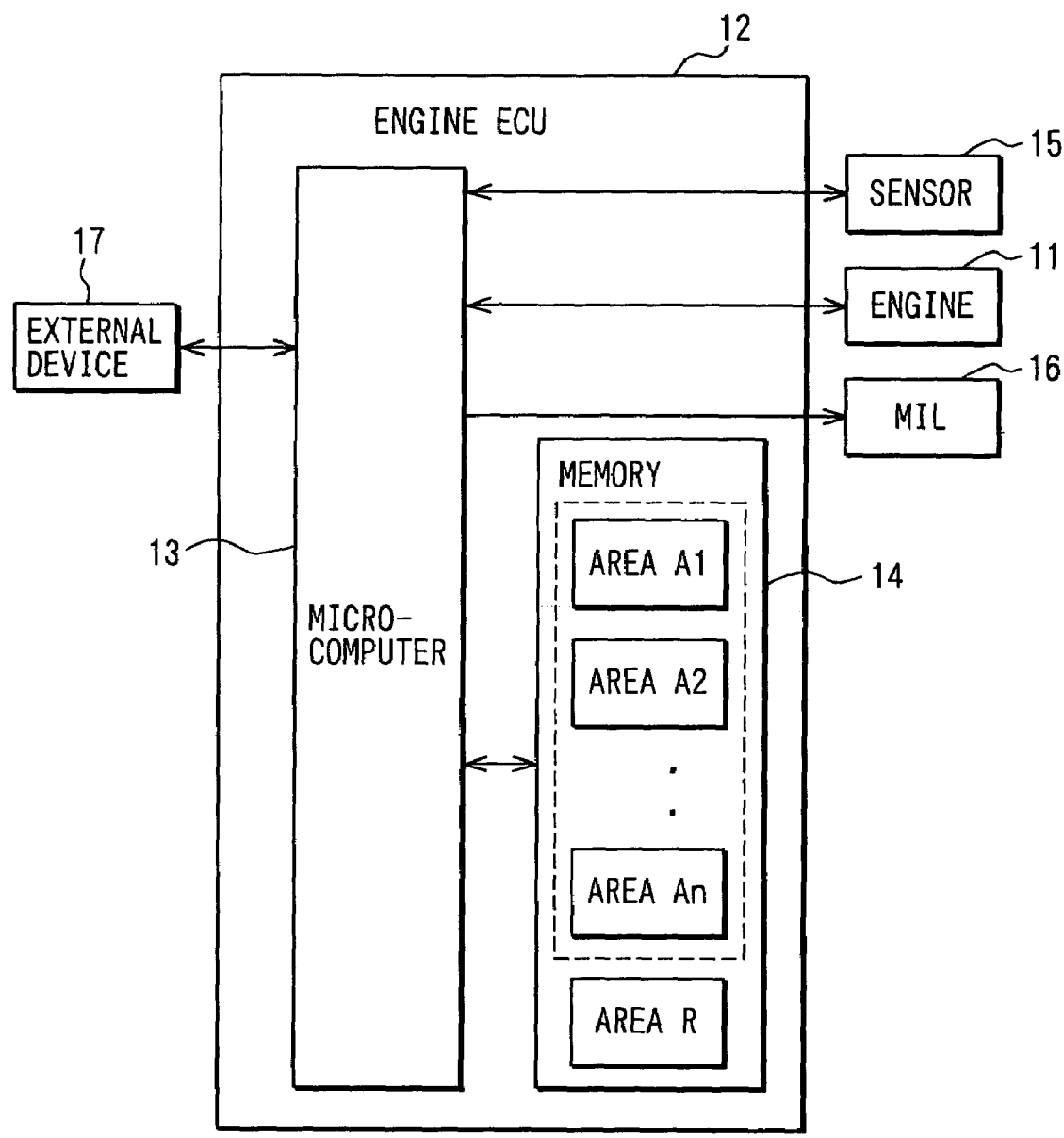
FIG. 4 is a block diagram showing an evaluation system for a fault diagnosis apparatus according to a second embodiment of the present invention.

In the second embodiment, a control system has an engine ECU 12 as shown in FIG. 4. The ECU 12 is connected to an engine 11, sensors 15, a MIL 16, and an external device 17 similar to the first embodiment. The ECU 12 has a microcomputer 13 and a memory 14.

In the second embodiment, the memory 14 has a plurality of record areas A1–An to store a plurality (e.g., 10 times) of the status data as in the first embodiment. The status data indicate the completion or the incompletion of performing the failure diagnosis.

The engine 11, the ECU 12, the microcomputer 13, the memory 14, the sensors 15, the MIL 16, and the external device 17 of the second embodiment are correspond to the engine 1, the ECU 2, the microcomputer 3, the memory 4, the sensors 5, the MIL 6, and the external device 7, respectively.

In the second embodiment, the memory 14 also has a result area R. The result area R stores a determination result that indicates a condition of the failure diagnosis function, which is determined based on the status data stored in the record areas A1–An. The result area R may be provided in another memory.

When the diagnosis function is determined to be in the normal condition in the same manner as the first embodiment, determination result data "1" is stored in the result area R. On the other hand, when the diagnosis function is determined to be in the abnormal condition, result data "0" is stored in the result area R.

Next, operations of the failure diagnosis apparatus according to the second embodiment will be explained.

1) Processes when the external device 17 requests.

Figure 5A:
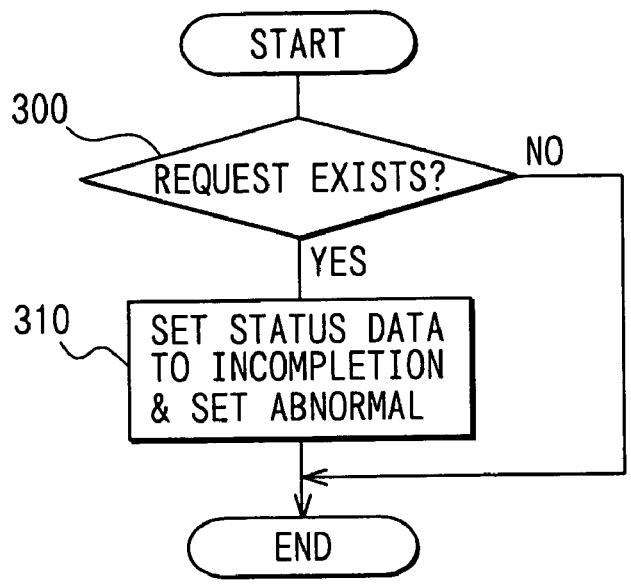
FIG. 5A is a flowchart showing a deletion process according to the second embodiment.

As shown in FIG. 5A, in step 300, it is determined whether the deletion request signal from the external device 17 exists or not. When the deletion request signal exists, the process proceeds to step 310. Otherwise, when the deletion request signal does not exist, the operation once ends.

In step 310, since the deletion request signal exists, all of the status data stored in the record areas A1–An are set to the incompletion. The status data indicates the completion or the incompletion of the inspection of the equipments, such as the sensors 15. In addition, the result area R, which stores the result in which the failure diagnosis is determined to be in a normal condition, is deleted. Then, the operation once ends.

The deletion request signal is the request for deleting all of the detection result stored in the record areas A1–An and the determination result stored in the result area R.

That is, in the processes, when the deletion request signal exists, every status data "1" stored in the record areas A1–An is set to "0". The status data "1" indicates the completion of the failure detection. The status data "0" indicates the incompletion. In addition, the determination result "1" stored in the result area R is set to "0". In the result area R, the result "1" indicates the normal condition of the failure diagnosis function. The result "0" indicates the abnormal condition of the failure diagnosis function.

2) Processes when driving cycle is ended.

Figure 5B:
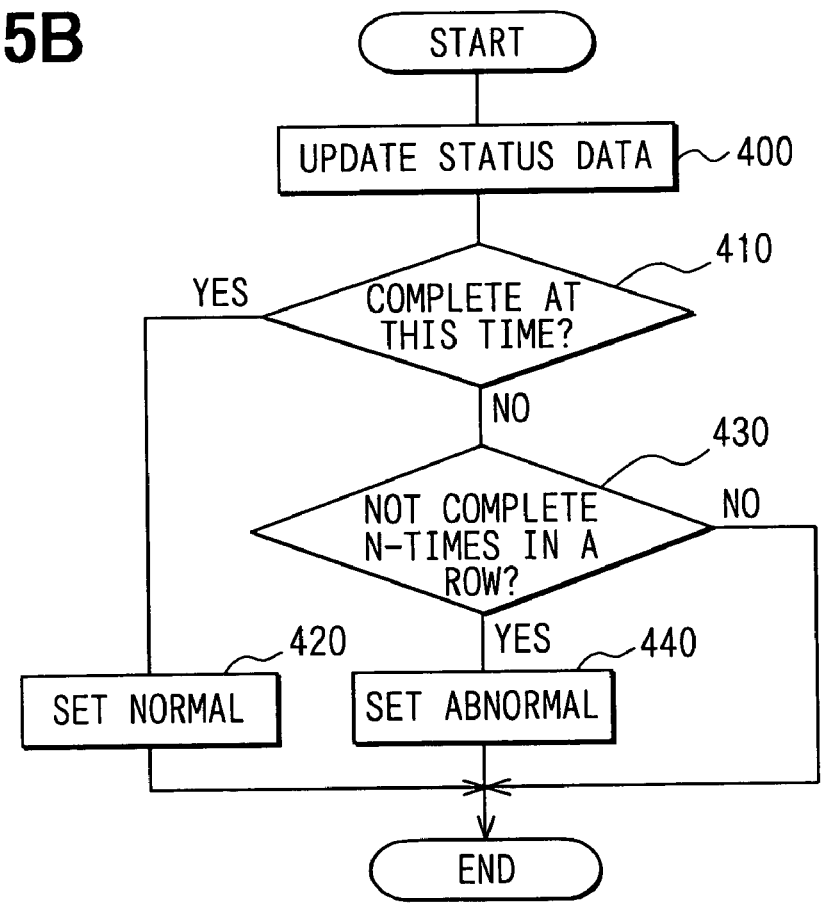
FIG. 5B is a flowchart showing an evaluation process according to the second embodiment.

As shown in FIG. 5B, in step 400, the status data are updated. The status data indicate the completion or the incompletion of the failure detection of the equipments, such as the sensors 15. In other words, the status data, which include latest ten data of the completion or the incompletion, are stored in the record areas A1–An.

In next step 410, it is determined whether the failure detection is completed at the latest failure detection, that is, at this time of the failure detection. When a judgment is determined to affirmative, the process proceeds to step 420. Otherwise, when the judgment is determined to negative, the process proceeds to step 430.

In step 420, since the failure detection of the sensors 15 is completed at this time of the failure detection, the diagnosis function is determined to be in the normal condition. The result area R stores a status data for the normal condition. That is, the result area R stores "1". Then, the operation once ends.

On the contrary, in step 430, it is determined whether the all of the latest failure detection are not completed ten times in a row. When a judgment of step 430 is determined to affirmative, the process proceeds to step 440. Otherwise, when the judgment is determined to negative, the process once ends.

In step 440, since all of the failure detection is not completed, the diagnosis function is determined to be in the abnormal condition. The determination result of the result area R is deleted. That is, the determination result is set to "0" in the result area R. Then, the operation once ends.

As a result, in such an operation of the second embodiment, it is determined whether the diagnosis function is in the normal condition or in the abnormal condition. That is, the status data, which indicate the completion or the incompletion of the failure detection of the sensors 5, are stored in the record areas A1–An. In addition, the determination result, which indicates the completion of the failure detection, is stored in the result area R. Then, it is determined that the failure diagnosis function is in the normal condition when the failure detection is completed at this time of the failure detection. On the other hand, it is determined that the failure diagnosis function is in the abnormal condition when all of the failure detection is not completed.

As a result, similarly to the first embodiment, the ECU 12 can determine the status of the diagnosis function as appropriate in the second embodiment. In addition, the MIL 16 can show the determination result, that is, the condition of the failure diagnosis function as shown in FIG. 3.

In particular, in the second embodiment, the determination result is stored in the result area R, so that the result can be retrieved at any time.

[Third Embodiment]

Figure 6:
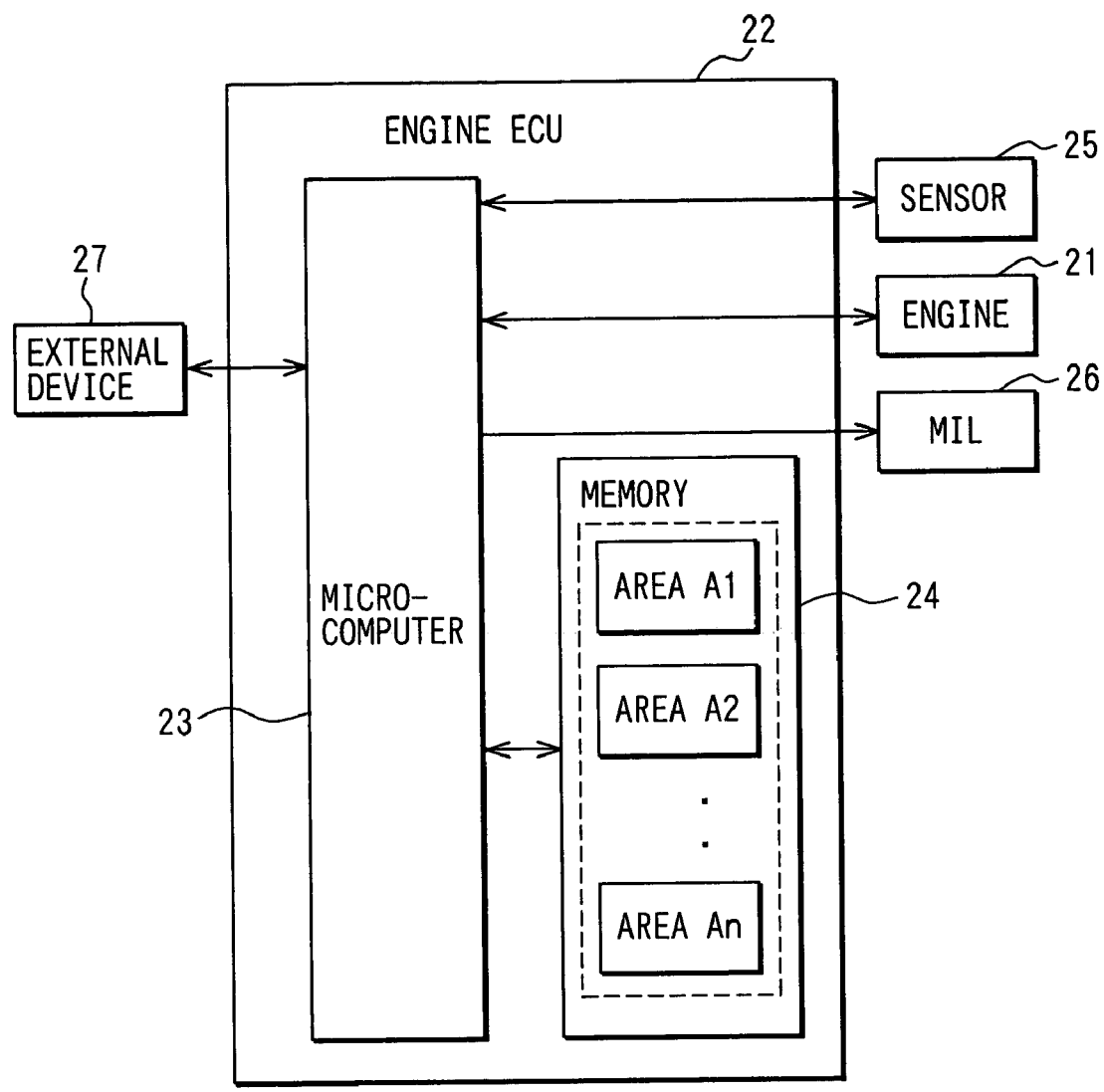
FIG. 6 is a block diagram showing an evaluation system for a fault diagnosis apparatus according to a third embodiment of the present invention.

As shown in FIG. 6, in the third embodiment, a control system has an engine ECU 22. The ECU 22 is connected to an engine 21, sensors 25, a MIL 26, and an external device 27. The ECU 22 has a microcomputer 23 and a memory 24.

The engine 21, the ECU 22, the microcomputer 23, the memory 24, the sensors 25, the MIL 26, and the external device 27 of the third embodiment are correspond to the engine 1, the ECU 2, the microcomputer 3, the memory 4, the sensors 5, the MIL 6, and the external device 7, respectively.

Next, operations of the failure diagnosis apparatus according to the third embodiment will be explained.

1) Processes when the external device 17 requests.

Figure 7A:
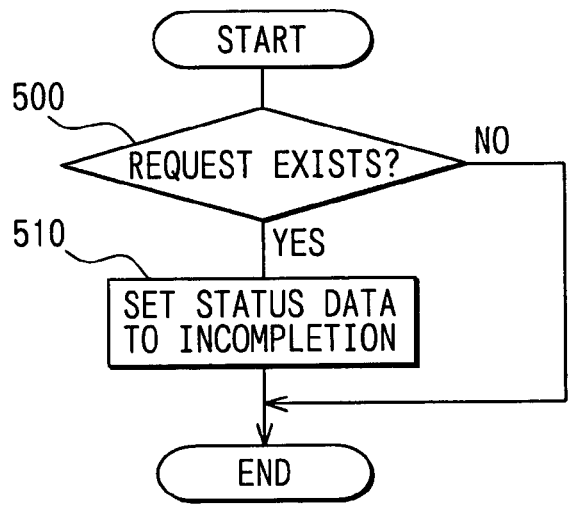
FIG. 7A is a flowchart showing a deletion process according to the third embodiment.

As shown in the flowchart of FIG. 7A, in step 500, it is determined whether the deletion request signal from the external device 27 exists or not. When the deletion request signal exists, the process proceeds to step 510. Otherwise, when the deletion request signal does not exist, the operation once ends.

In step 510, since the deletion request signal exists, all of the status data stored in the record areas A1–An are set to the incompletion. The status data indicates the completion or the incompletion of the inspection of the equipments, such as the sensors 5. Then, the operation once ends.

That is, in the processes, when the deletion request signal exists, every status data "1" stored in the record areas A1–An is set to "0". The status data "1" indicates the completion of the failure detection. The status data "0" indicates the incompletion.

2) Processes when driving cycle is ended.

Figure 7B:
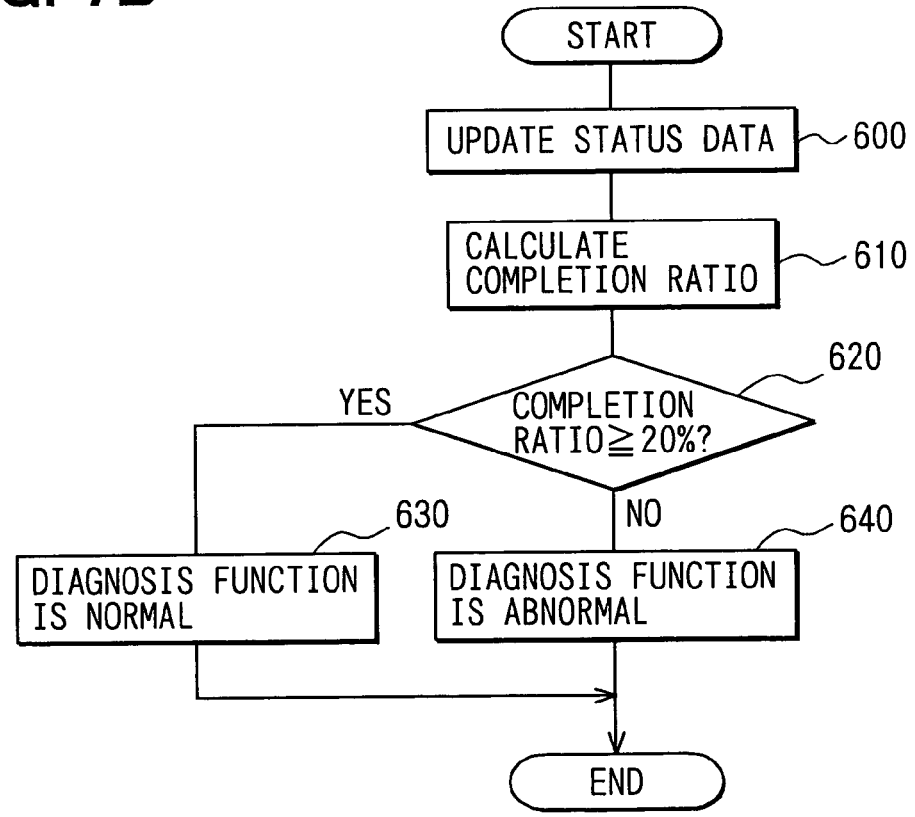
FIG. 7B is a flowchart showing an evaluation process according to the third embodiment.

As shown in FIG. 7B, in step 600, the status data are updated. The status data indicate the completion or the incompletion of the failure detection of the equipments, such as the sensors 25. In other words, the status data, which include latest ten data of the completion or the incompletion, are stored in the record areas A1–An.

In next step 610, a completion ratio is calculated based on the ten data of the completion or the incompletion stored in the record areas A1–An. In detail, the completion ratio is calculated by dividing the number of the completion by the sum of the completion and the incompletion.

In next step 620, it is determined whether the completion ratio is not less than 20%. When a judgment is determined to affirmative, the process proceeds to step 630. Otherwise, when the judgment is determined to negative, the process proceeds to step 640.

In step 630, since the completion ratio is as high as 20% or more, the diagnosis function is determined to be in the normal condition. The MIL 26 is activated to show the normal condition of the diagnosis function. Then, the operation once ends.

In step 640, since the completion ratio is low, the diagnosis function is determined to be in the abnormal condition. The MIL 26 is activated to show the abnormal condition of the diagnosis function. Then, the operation once ends.

As a result, in such an operation of the third embodiment, the ECU 22 can determine whether the diagnosis function is in the normal condition or in the abnormal condition. In addition, the MIL 26 can show the condition.

In the third embodiment, the status data are stored in the record areas A1–An. The status data indicate the completion or the incompletion of the failure detection of the sensors 25. The completion ratio is calculated based on the status data, that is, the stored data in the record areas A1–An. When the completion ratio is high, the diagnosis function is determined to be in the normal condition. When the completion ratio is low, the diagnosis function is determined to be in the abnormal condition.

As a result, similarly to the first embodiment, the ECU 22 can determine the status of the diagnosis function as appropriate in the third embodiment.

In particular, in the third embodiment, the failure detection is determined based on the completion ratio, so that the diagnosis function can be determined rapidly even when the consecutive data of the completion or the incompletion are not collected (especially when frequency of the failure detection is few times).

[Fourth Embodiment]

Figure 8:
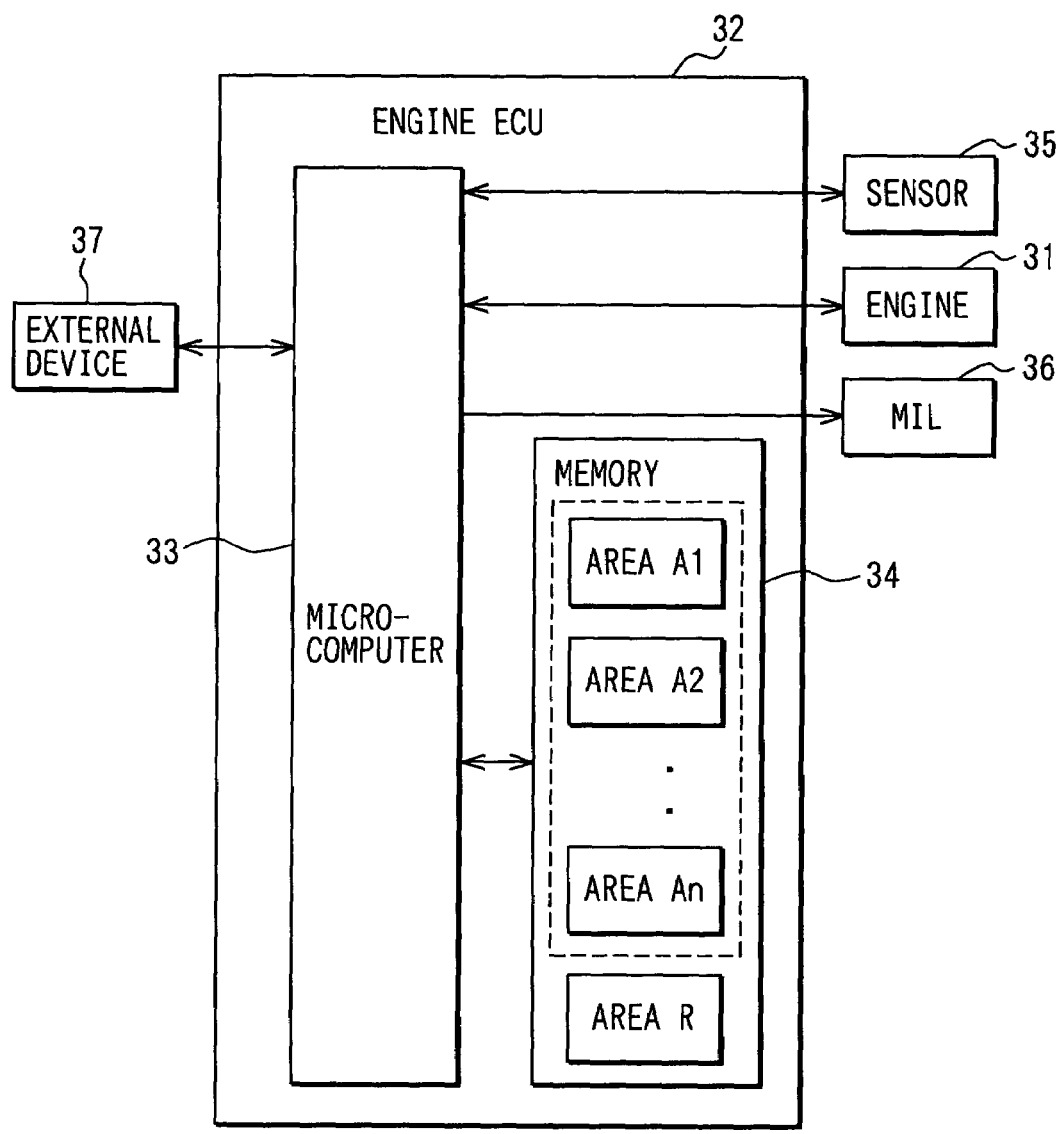
FIG. 8 is a block diagram showing an evaluation system for a fault diagnosis apparatus according to a fourth embodiment of the present invention.

The fourth embodiment is similar to the second embodiment. As shown in FIG. 8, a control system has an engine ECU 32. The ECU 32 is connected to an engine 31, sensors 35, a MIL 36, and an external device 37. The ECU 32 has a microcomputer 33 and a memory 34.

The engine 31, the ECU 32, the microcomputer 33, the memory 34, the sensors 35, the MIL 36, and the external device 37 of the fourth embodiment are correspond to the engine 11, the ECU 12, the microcomputer 13, the memory 14, the sensors 15, the MIL 16, and the external device 17, respectively.

In the fourth embodiment, the memory 34 has a plurality of record areas A1–An to store a plurality (e.g., 10 times) of the status data as in the second embodiment. The status data indicate the completion or the incompletion of performing the failure diagnosis. The memory 34 also has a result area R. The result area R stores a determination result that indicates a condition of the failure diagnosis determined based on the status data stored in the record areas A1–An.

Next, operations of the failure diagnosis apparatus according to the second embodiment will be explained.

1) Processes when the external device 37 requests.

Figure 9A:
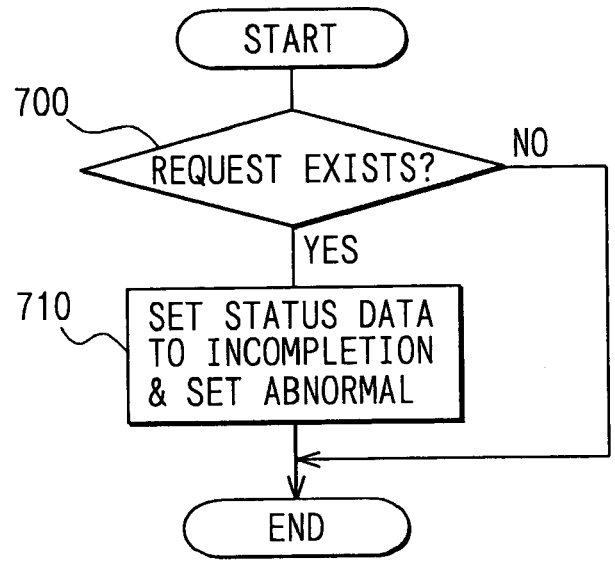
FIG. 9A is a flowchart showing a deletion process according to the fourth embodiment.

As shown in a flowchart of FIG. 9A, in step 700, it is determined whether the deletion request signal from the external device 37 exists or not. When the deletion request signal exists, the process proceeds to step 710. Otherwise, when the deletion request signal does not exist, the operation once ends.

In step 710, since the deletion request signal exists, all of the status data stored in the record areas A1–An are set to the incompletion. The status data indicates the completion or the incompletion of the inspection of the equipments, such as the sensors 15. In addition, the result area R, which stores the result in which the failure diagnosis is determined to be in the normal condition or in the abnormal condition, is deleted. Then, the operation once ends.

That is, in the processes, when the deletion request signal exists, every status data "1" stored in the record areas A1–An is set to "0". The status data "1" indicates the completion of the failure detection. The status data "0" indicates the incompletion. In addition, the determination result "1" stored in the result area R is set to "0". In the result area R, the result "1" indicates the normal condition of the failure diagnosis function. The result "0" indicates the abnormal condition of the failure diagnosis function.

2) Processes when driving cycle is ended.

Figure 9B:
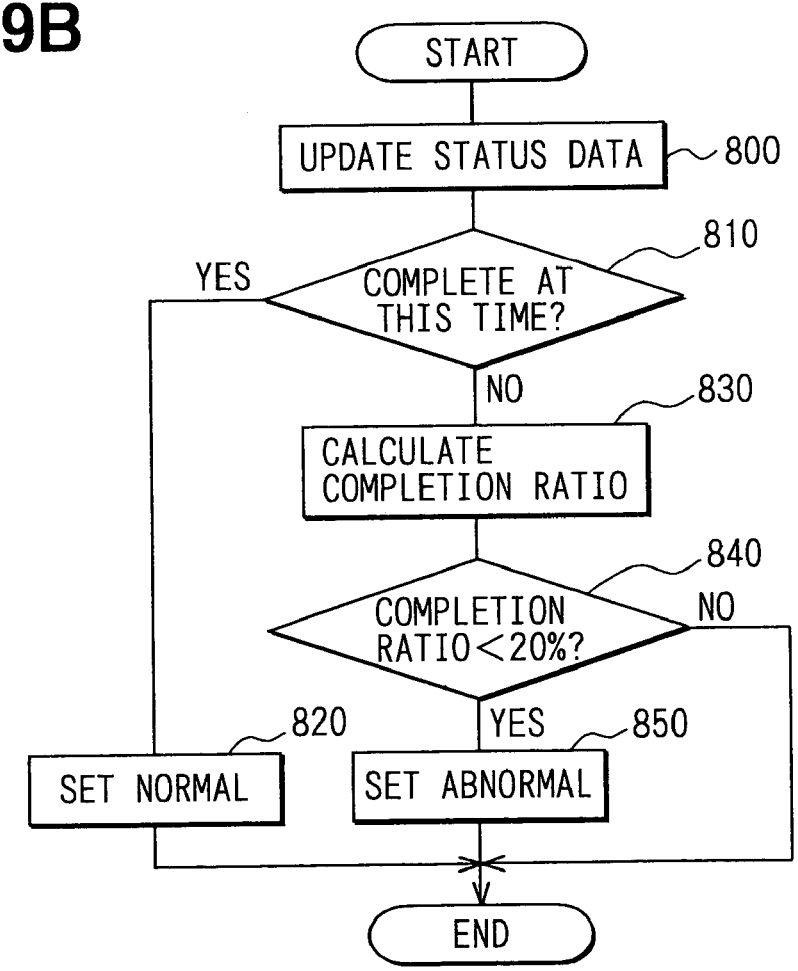
FIG. 9B is a flowchart showing an evaluation process according to the fourth embodiment.

As shown in FIG. 9B, in step 800, the status data are updated. The status data indicate the completion or the incompletion of the failure detection of the equipments, such as the sensors 35. In other words, the status data, which include latest ten data of the completion or the incompletion, are stored in the record areas A1–An.

In next step 810, it is determined whether the failure detection is completed at the latest failure detection, that is, at this time of the failure detection. When a judgment is determined to affirmative, the process proceeds to step 820. Otherwise, when the judgment is determined to negative, the process proceeds to step 830.

In step 820, since the failure detection of the sensors 35 is completed at this time of the failure detection, the diagnosis function is determined to be in the normal condition. The result area R stores a status data for the normal condition. That is, the result area R stores "1". Then, the operation once ends.

On the contrary, in step 830, the completion ratio is calculated based on the ten data of the completion or the incompletion stored in the record areas A1–An in the same manner as step 610 shown in FIG. 7B of the third embodiment.

In next step 840, it is determined whether the completion ratio is less than 20%. When a judgment is determined to affirmative, the process proceeds to step 850. Otherwise, when the judgment is determined to negative, the process once ends.

In step 850, since the completion ratio is as low as 20% or less, the diagnosis function is determined to be in the abnormal condition. The determination result of the result area R is deleted. That is, the determination result is set to "0" in the result area R. Then, the operation once ends.

As a result, in such an operation of the fourth embodiment, the ECU 32 can determine whether the diagnosis function is in the normal condition or in the abnormal condition.

According to the fourth embodiment, the status data are stored in the record areas A1–An. The status data indicate the completion or the incompletion of the failure detection of the sensors 35. In addition, the determination result, which indicates the completion of the failure detection, is stored in the result area R. Then, it is determined that the failure diagnosis function is in the normal condition when the failure detection is completed at this time of the failure detection. On the other hand, it is determined that the failure diagnosis function is in the abnormal condition when the completion ratio is low.

As a result, similarly to the second embodiment, the ECU 32 can determine the status of the diagnosis function as appropriate. In addition, the MIL 36 can show the determination result. Furthermore, since the status is determined based on the completion ratio, the fourth embodiment has the similar effect as the third embodiment.

[Fifth Embodiment]

Figure 10:
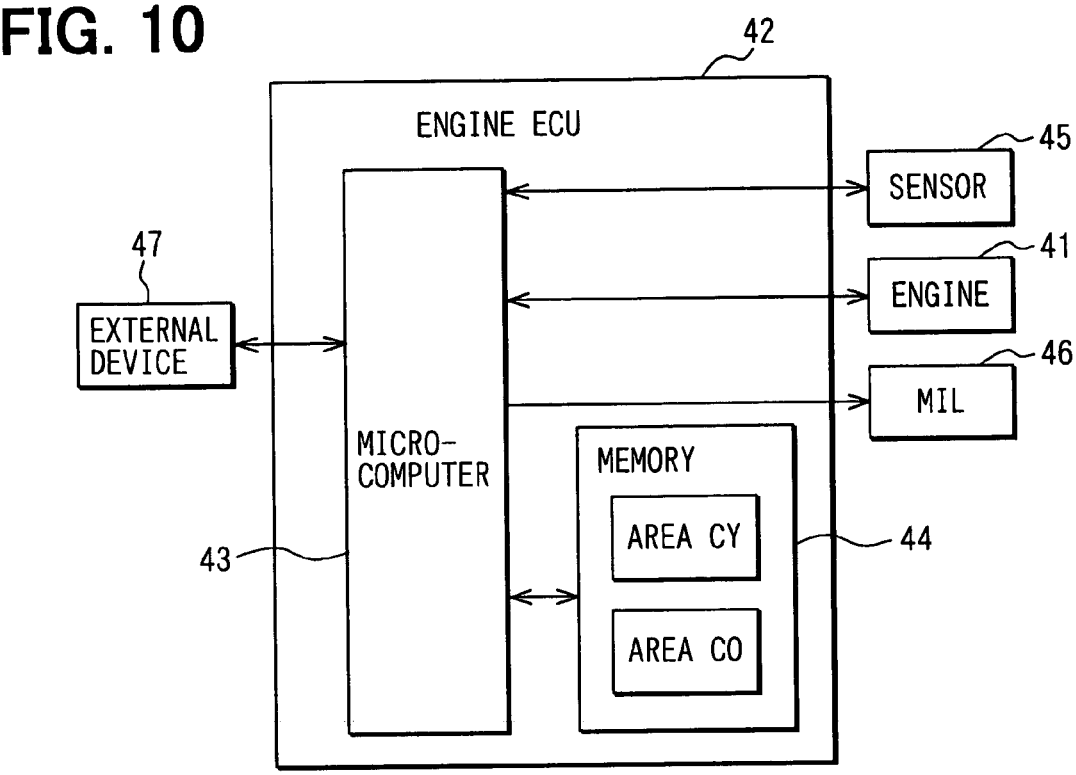
FIG. 10 is a block diagram showing an evaluation system for a fault diagnosis apparatus according to a fifth embodiment of the present invention.

As shown in FIG. 10, in the fifth embodiment, a control system has an engine ECU 42. The ECU 42 is connected to an engine 41, sensors 45, a MIL 46, and an external device 47. The ECU 42 has a microcomputer 43 and a memory 44.

The engine 41, the ECU 42, the microcomputer 43, the memory 44, the sensors 45, the MIL 46, and the external device 47 of the fifth embodiment are correspond to the engine 1, the ECU 2, the microcomputer 3, the memory 4, the sensors 5, the MIL 6, and the external device 7, respectively.

In the fifth embodiment, the memory 44 has a cycle number area CY and a completion number area CO. The cycle number area CY stores the number of the startup (driving cycle). The completion number area CO stores the number of the completion of the failure detection.

Next, operations of the failure diagnosis apparatus according to the fifth embodiment will be explained.

1) Processes when the external device 47 requests.

Figure 11A:
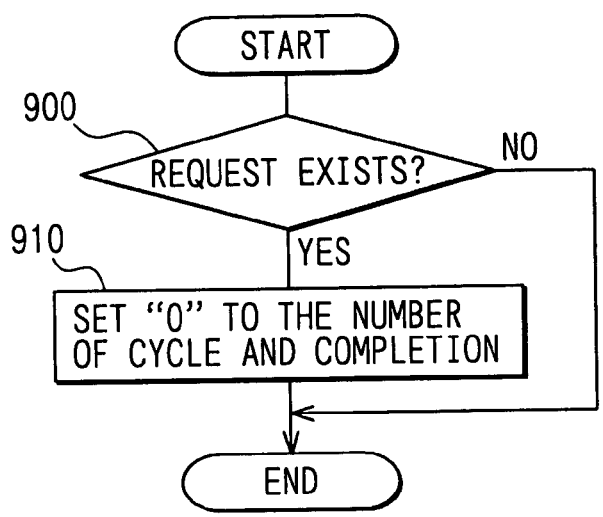
FIG. 11A is a flowchart showing a deletion process according to the fifth embodiment.

As shown in the flowchart of FIG. 11A, in step 900, it is determined whether the deletion request signal from the external device 47 exists or not. When the deletion request signal exists, the process proceeds to step 910. Otherwise, when the deletion request signal does not exist, the operation once ends.

In step 910, since the deletion request signal exists, the numbers of the driving cycle and the completion of the failure detection are set to "0". Then, the operation once ends.

2) Processes when driving cycle is ended.

Figure 11B:
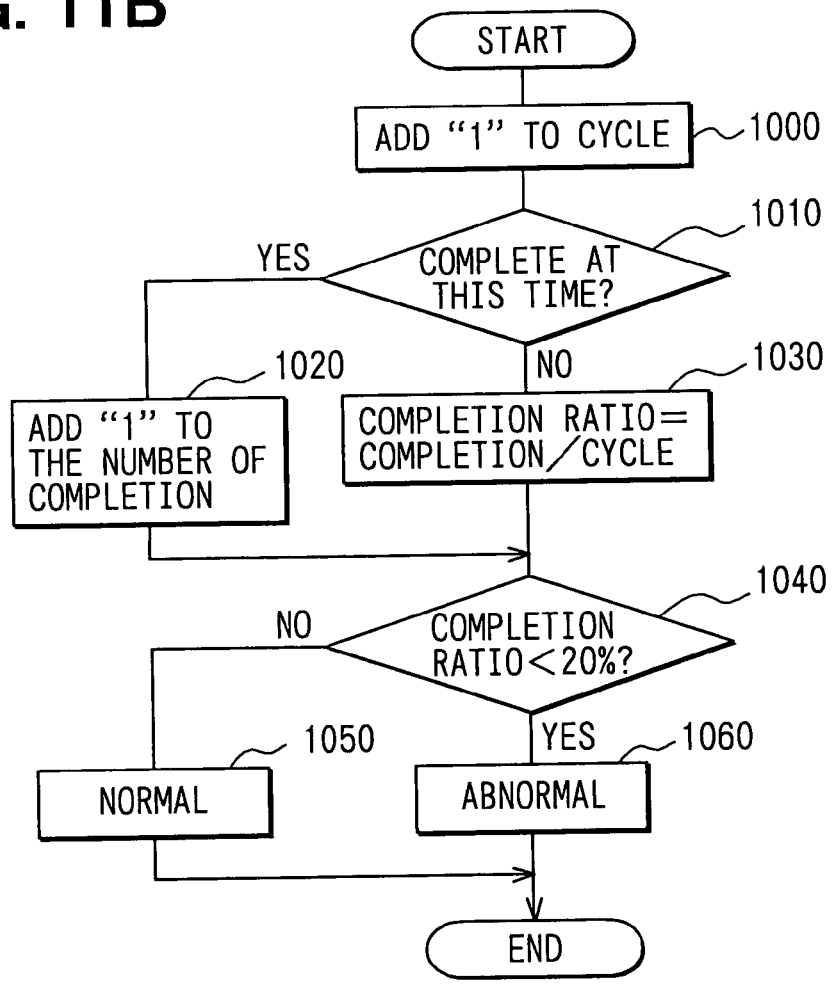
FIG. 11B is a flowchart showing an evaluation process according to the fifth embodiment.

As shown in a flowchart of FIG. 11B, in step 1000, numerical value "1" is added to the number of the driving cycle with passing this routine.

In next step 1010, it is determined whether the failure detection is completed at the latest failure detection, that is, at this time of the failure detection. When a judgment is determined to affirmative, the process proceeds to step 1020. Otherwise, when the judgment is determined to negative, the process proceeds to step 1030.

In step 1020, since the failure detection of the sensors 35 is completed at this time of the failure detection, a numerical value "1" is added to the number of the completion of the failure detection. Then, the process proceeds to step 1040.

In step 1030, the completion ratio is calculated in the same manner as step 610 shown in FIG. 7B of the third embodiment. That is, the completion ratio is calculated by dividing the number of the completion of the failure detection by the number of the driving cycle.

In step 1040, it is determined whether the completion ratio is less than 20%. When a judgment is determined to affirmative, the process proceeds to step 1060. Otherwise, when the judgment is determined to negative, the process proceeds to step 1050.

In step 1050, the diagnosis function is determined to be in the normal condition, so that the MILL 46 is activated to indicate the normal condition. Then, the operation once ends.

On the other hand, in step 1060, since the completion ratio is low, the diagnosis function is determined to be in the abnormal condition. The MIL 46 is activated to indicate the abnormal condition. Then, the operation once ends.

As a result, in such an operation of the fifth embodiment, the ECU 42 can determine whether the diagnosis function is in the normal condition or in the abnormal condition.

In the fifth embodiment, the completion ratio after the deletion request signal from the external device 47 is calculated. When the completion ratio is low, the diagnosis function is determined to be in the abnormal condition. Otherwise, when the completion ratio is high, the diagnosis function is determined to be in the normal condition.

As a result, similarly to the first embodiment, the ECU 42 can determine the status of the diagnosis function as appropriate. In addition, the MIL 46 can indicate the determination result. Furthermore, since the status is determined based on the completion ratio, the fifth embodiment has the similar effect as the third embodiment.

[Sixth Embodiment]

Figure 12:
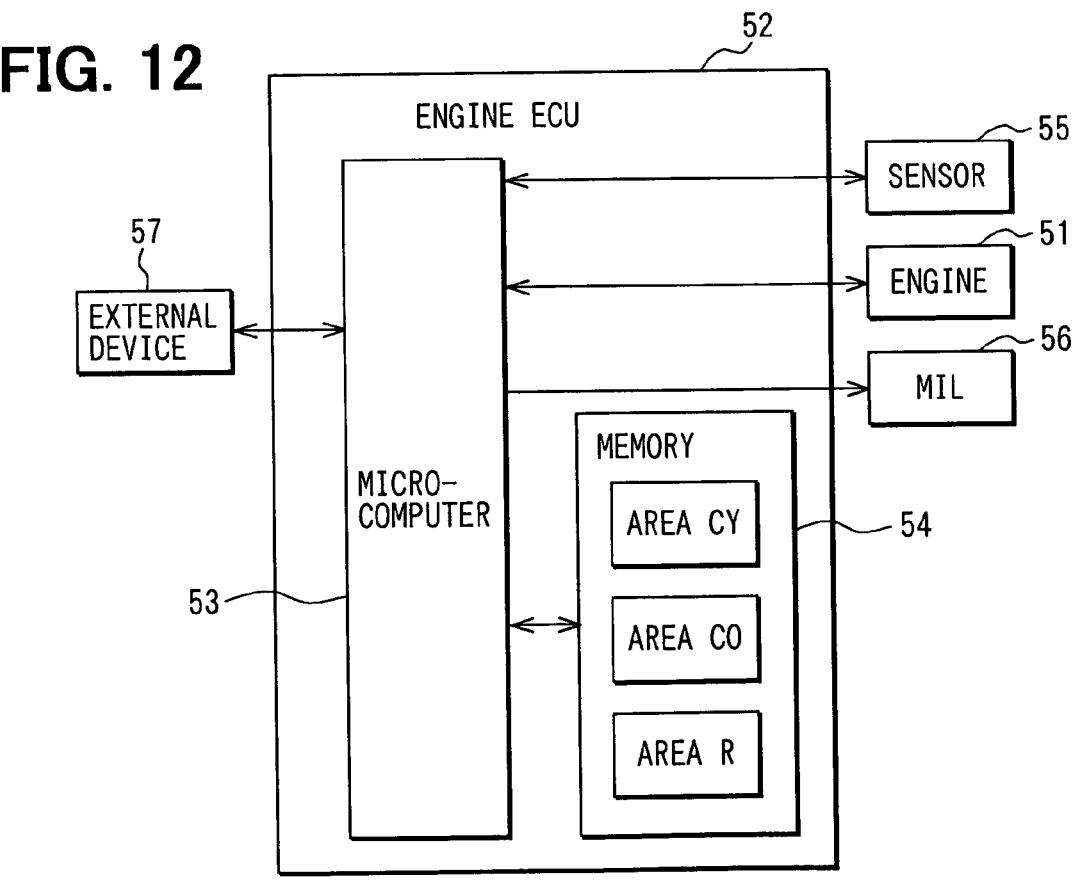
FIG. 12 is a block diagram showing an evaluation system for a fault diagnosis apparatus according to a sixth embodiment of the present invention.

The sixth embodiment is similar to the fifth embodiment. As shown in FIG. 12, a control system has an engine ECU 52. The ECU 52 is connected to an engine 51, sensors 55, a MIL 56, and an external device 57. The ECU 52 has a microcomputer 53 and a memory 54.

The engine 51, the ECU 52, the microcomputer 53, the memory 54, the sensors 55, the MIL 56, and the external device 57 of the sixth embodiment are correspond to the engine 41, the ECU 42, the microcomputer 43, the memory 44, the sensors 45, the MIL 46, and the external device 47 of the fifth embodiment, respectively.

In the sixth embodiment, the memory 54 has the cycle number area CY and the completion number area CO. The cycle number area CY stores the number of the startup (driving cycle). The completion number area CO stores the number of the completion of the failure detection. The memory 54 also has the result area R. The result area R stores a determination result that indicates a condition of the failure diagnosis determined based on the numbers of the driving cycle and the completion of the failure detection stored in the cycle number area CY and the completion number area CO, respectively.

Next, operations of the failure diagnosis apparatus according to the sixth embodiment will be explained.

1) Processes when the external device 57 requests.

Figure 13A:
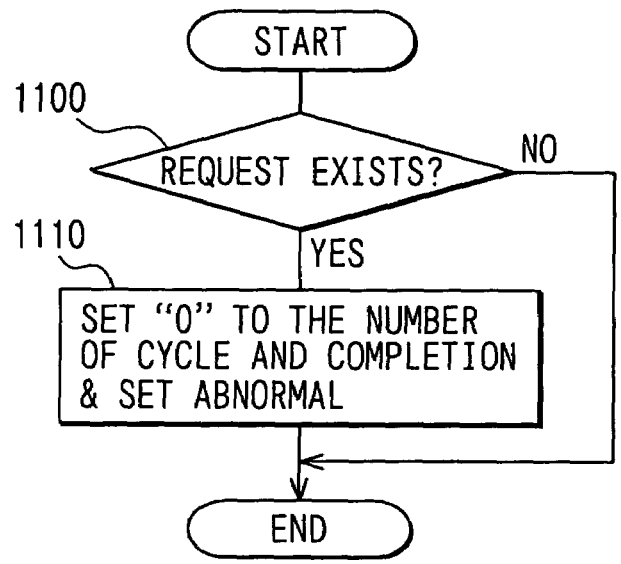
FIG. 13A is a flowchart showing a deletion process according to the sixth embodiment.

As shown in a flowchart of FIG. 13A, in step 1100, it is determined whether the deletion request signal from the external device 57 exists or not. When the deletion request signal exists, the process proceeds to step 1110. Otherwise, when the deletion request signal does not exist, the operation once ends.

In step 1110, since the deletion request signal exists, the numbers of the driving cycle and the completion of the failure detection are set to "0". In addition, the determination result in the result area R in which the failure diagnosis is determined to be in the normal condition or in the abnormal condition is deleted. Then, the operation once ends.

2) Processes when driving cycle is ended.

Figure 13B:
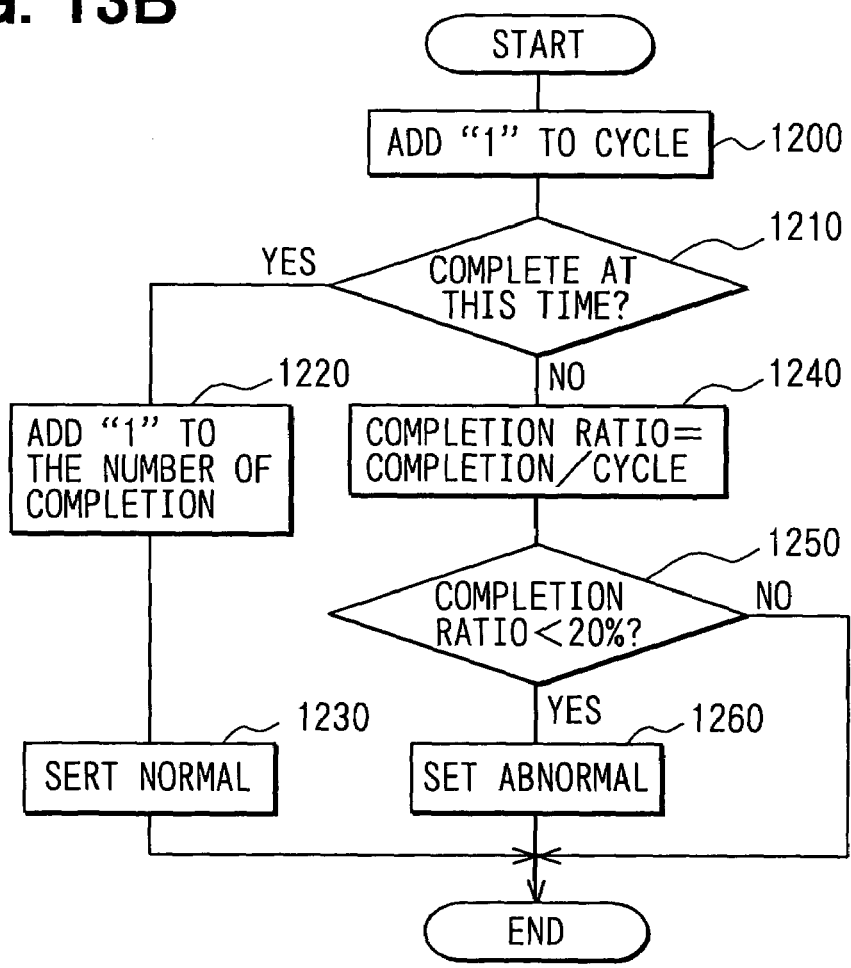
FIG. 13B is a flowchart showing an evaluation process according to the sixth embodiment.

As shown in a flowchart of FIG. 13B, in step 1200, numerical value "1" is added to the number of the driving cycle with passing this routine.

In next step 1210, it is determined whether the failure detection is completed at the latest failure detection, that is, at this time of the failure detection. When a judgment is determined to affirmative, the process proceeds to step 1220. Otherwise, when the judgment is determined to negative, the process proceeds to step 1240.

In step 1220, since the failure detection of the sensors 55 is completed at this time of the failure detection, a numerical value "1" is added to the number of the completion of the failure detection.

In next step 1230, the diagnosis function is determined to be in the normal condition, so that the determination result that indicates the normal condition is stored in the result area R. That is, the determination result data "1" is stored in the result area R. Then, the operation once ends.

On the other hand, in step 1240, the completion ratio is calculated in the same manner as step 1030 shown in FIG. 11B of the fifth embodiment.

In next step 1240, it is determined whether the completion ratio is less than 20%. When a judgment is determined to affirmative, the process proceeds to step 1260. Otherwise, when the judgment is determined to negative, the process once ends.

In step 1260, since the completion ratio is low, the diagnosis function is determined to be in the abnormal condition. The determination result of the result area R is deleted. That is, That is, the determination result is set to "0" in the result area R. Then, the operation once ends.

As a result, in such an operation of the sixth embodiment, the ECU 52 can determine whether the diagnosis function is in the normal condition or in the abnormal condition.

In the sixth embodiment, the completion ratio after the deletion request signal from the external device 57 is calculated. When the completion ratio is low, the diagnosis function is determined to be in the abnormal condition.

As a result, similarly to the fifth embodiment, the ECU 52 can determine the status of the diagnosis function as appropriate. In addition, the MIL 56 can indicate the determination result. Furthermore, since the status is determined based on the completion ratio, the sixth embodiment has the similar effect as the third embodiment.

[Seventh Embodiment]

Figure 14:
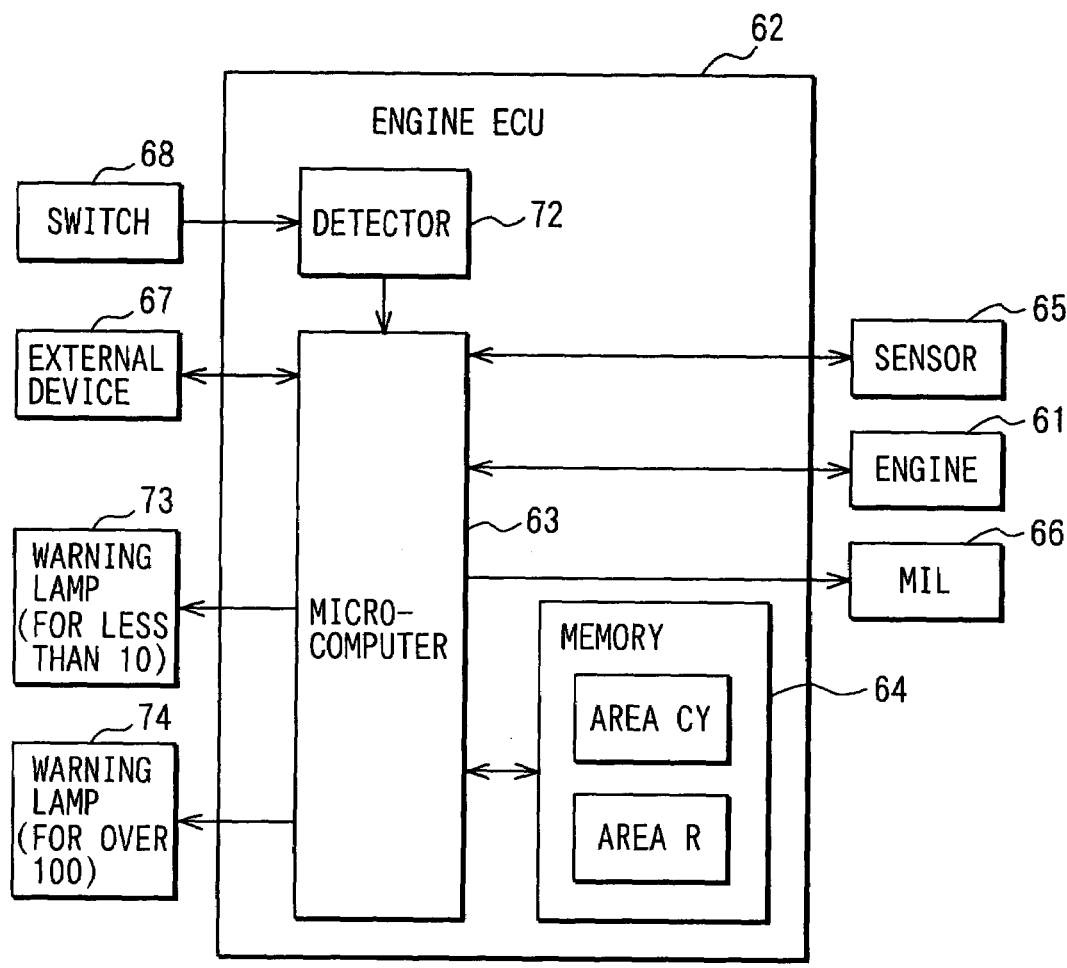
FIG. 14 is a block diagram showing an evaluation system for a fault diagnosis apparatus according to a seventh embodiment of the present invention; .

As shown in FIG. 14, in the seventh embodiment, a control system has an engine ECU 62. The ECU 62 is connected to an engine 61, sensors 65, a MIL 66, and an external device 67. The engine 61, the ECU 62, the microcomputer 63, the memory 64, the sensors 65, the MIL 66, and the external device 67 of the seventh embodiment are correspond to the engine 51, the ECU 52, the microcomputer 53, the memory 54, the sensors 55, the MIL 56, and the external device 57 of the sixth embodiment, respectively.

The ECU 62 is also connected to a switch 71, a first warning lamp 73, and a second warning lamp 74. The switch 71 is operated by a driver with a manual operation. The first warning lamp 73 is lighted when the number of the failure detection of the sensors 65 is less than ten times. The second warning lamp 74 is lighted when the number of the failure detection of the sensors 65 is more than 100 times.

In the seventh embodiment, the memory 64 has the cycle number area CY and the result area R. The cycle number area CY stores the number of the startup (driving cycle). The result area R stores a determination result that indicates the determination result of the failure diagnosis.

Next, operations of the failure diagnosis apparatus according to the seventh embodiment will be explained.

1) Processes when the switch 71 and the external device 67 requests.

Figure 15A:
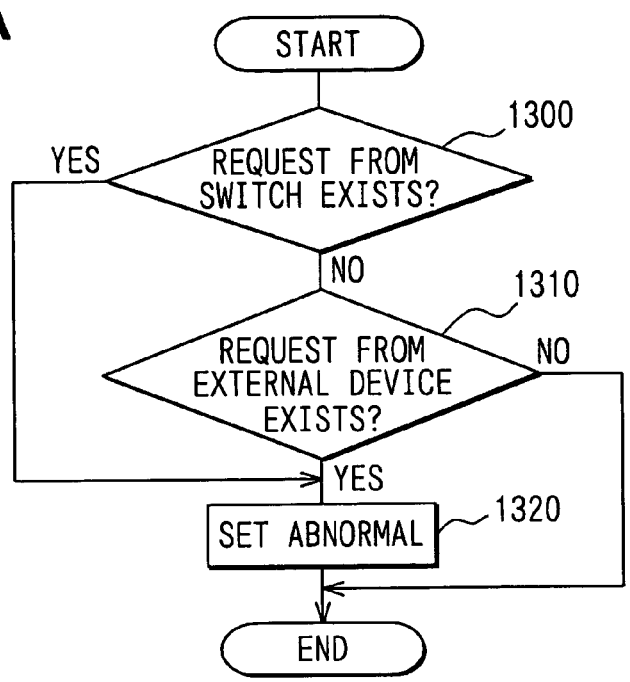
FIG. 15A is a flowchart showing a deletion process according to the seventh embodiment.

As shown in a flowchart of FIG. 15A, in step 1300, it is determined whether the deletion request signal from the switch 71 exists or not. When a judgment is determined to affirmative, that is, the deletion request signal from the switch 71 exists, the process proceeds to step 1320. Otherwise, when the judgment is determined to negative, the process proceeds to step 1310.

In step 1310, it is determined whether the deletion request signal from the external device 67 exists or not. When a judgment is determined to affirmative, that is, the deletion request signal from the external device 67 exists, the process proceeds to step 1320. Otherwise, when the judgment is determined to negative, the process once ends.

In step 1320, since the deletion request signal exists, the determination result in the result area R in which the failure diagnosis is determined to be in the normal condition or in the abnormal condition is deleted. Then, the operation once ends.

The number of the driving cycle is deleted, that is, set to "0", while the result area R is deleted.

2) Processes when driving cycle is ended.

Figure 15B:
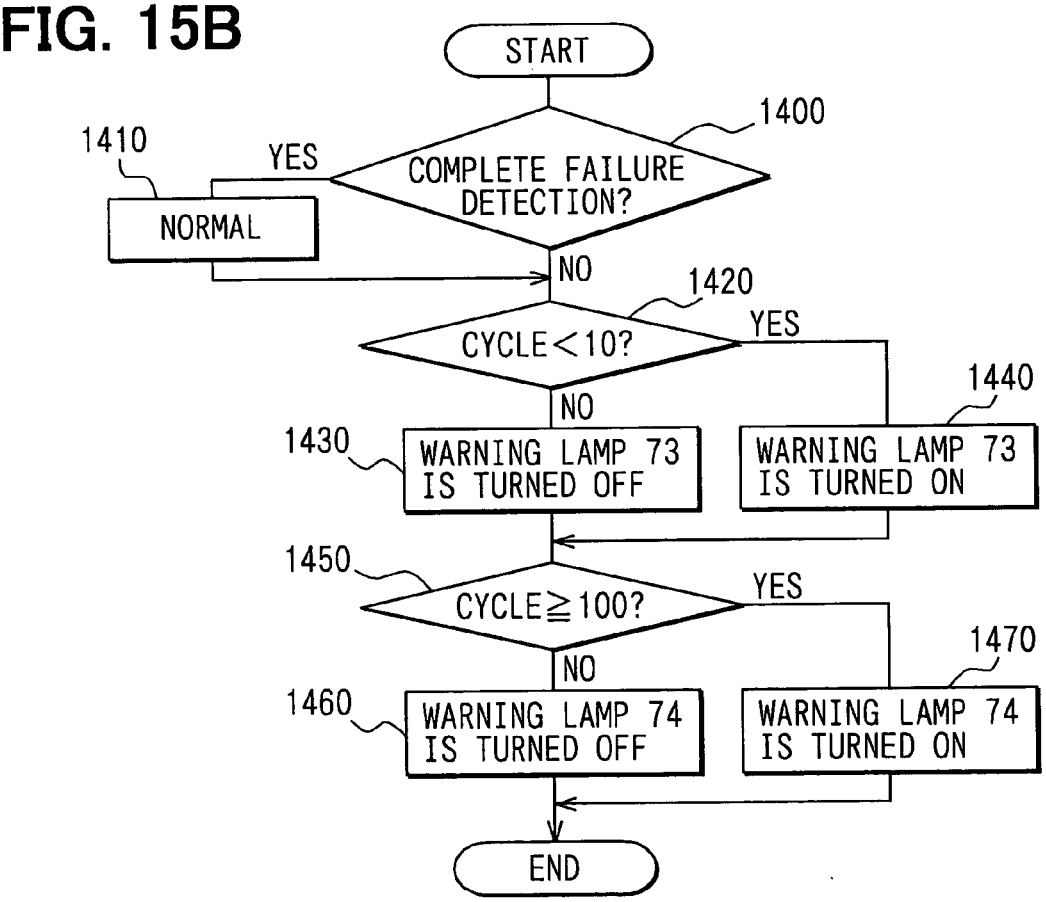
FIG. 15B is a flowchart showing an evaluation process according to the seventh embodiment.

As shown in a flowchart of FIG. 15B, in step 1400, it is determined whether the failure detection is completed at the latest failure detection, that is, at this time of the failure detection. When a judgment is determined to affirmative, the process proceeds to step 1410. Otherwise, when the judgment is determined to negative, the process proceeds to step 1420.

In step 1410, since the failure detection of the sensors 15 is completed at this time of the failure detection, the diagnosis function is determined to be in the normal condition. The determination result that indicates the normal condition is stored in the result area R. That is, the determination result data "1" is stored in the result area R.

In step 1420, it is determined whether the driving cycle is less than ten times or not. When a judgment is determined to affirmative, the process proceeds to step 1440. Otherwise, when the judgment is determined to negative, the process proceeds to step 1430.

In step 1440, since the driving cycle is less than ten times, the first warning lamp 73 is turned on so as to indicate the status of the number to the driver. This is because the result area R can be deleted by the manual operation of the switch 71. In such a situation, the ten times or less number of the failure detection is few, so that the diagnosis function cannot be correctly determined to be in the normal condition or in the abnormal condition.

In step 1430, since the driving cycle is not less than ten times, the first warning lamp 73 is not turned on (that is, turned off). Then, the process proceeds to step 1450.

In step 1450, it is determined whether the driving cycle is not less than 100 times or not. When a judgment is determined to affirmative, the process proceeds to step 1470.

Otherwise, when the judgment is determined to negative, the process proceeds to step 1460.

In step 1470, since the driving cycle is not less than 100 times, the second warning lamp 74 is turned on. Then, the process once ends. The condition, in which the second warning lamp 74 is turned on, continues. This requires the driver to operate the switch 71 to delete the determination result stored in the result area R.

This is because rather old data may be remained in the memory 64 when 100 times or more number of the detection results is counted. In such a situation, it is difficult to determine the recent status.

In step 1460, since the driving cycle is less than 100 times, the second warning lamp 74 is not turned on (that is, turned off). Then, the process once ends.

Figure 16:
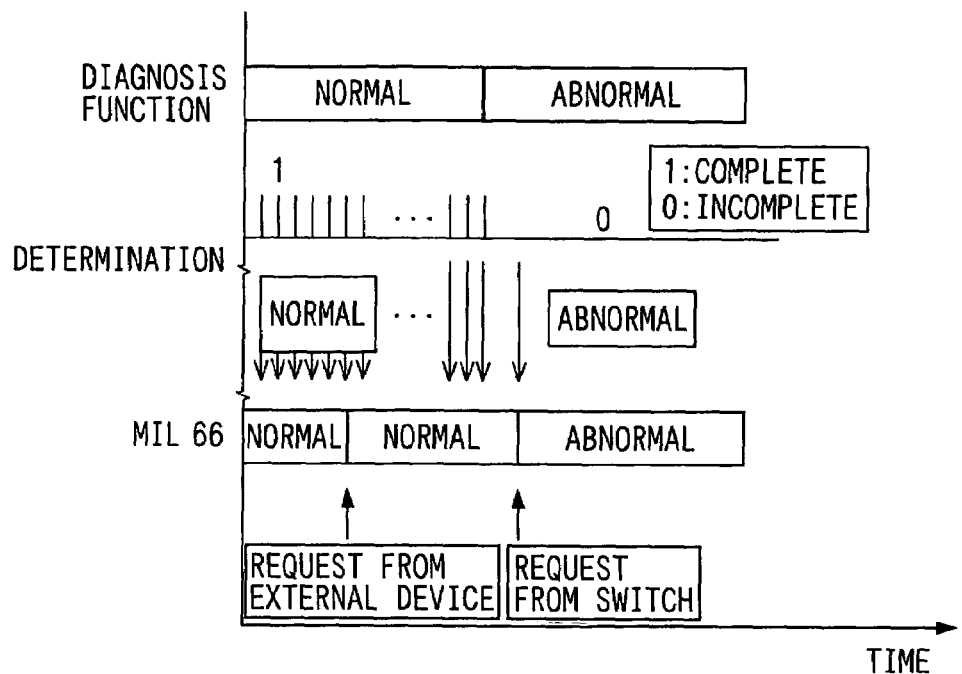
FIG. 16 is a timing chart of the evaluation system according to the seventh embodiment.

In the seventh embodiment, as shown in FIG. 16, it is premised that the determination result is deleted with the operation of the switch 71 by the driver. When the switch 71 is operated by the driver, the determination result in the result area R of the memory 64 is deleted, that is, is set to "0". As a result, the status of the diagnosis function is once set in the abnormal condition, and the MIL 66 shows the abnormal condition of the diagnosis function.

After that, the status of the diagnosis function is determined to in the normal condition or in the abnormal condition in steps 1400, 1410. Then, it is realized by the driver that the determination result has reliability or not because of the indication of the first and second warning lamps 73, 74. That is, the reliability of the determination result is realized by the driver during a lamp-off period in which both lamps 73, 74 are turned off.

In other words, when the driving cycle is between 10 to 100 times, the both lamp 73, 74 are turned off. In such a period, it is a suitable condition for determining the status of the diagnosis function. Therefore, it can be effectively realized the status of the diagnosis function.

According to the seventh embodiment, since the second warning lamp 74 is turned on when the driving cycle is not less than 100 times, a need for the operation of the switch 71 is notified to the driver. Accordingly, it can be prevented from determining the status of the diagnosis function based on old data if the switch 71 is operated.

Instead of the determination method of the seventh embodiment, it can be modified that the status of the diagnosis function is determined while the first and second warning lamp 73, 74 are turned off. In such a modification, the ECU 62 can determine the status of the diagnosis function as appropriate.

[Eighth Embodiment]

Figure 17:
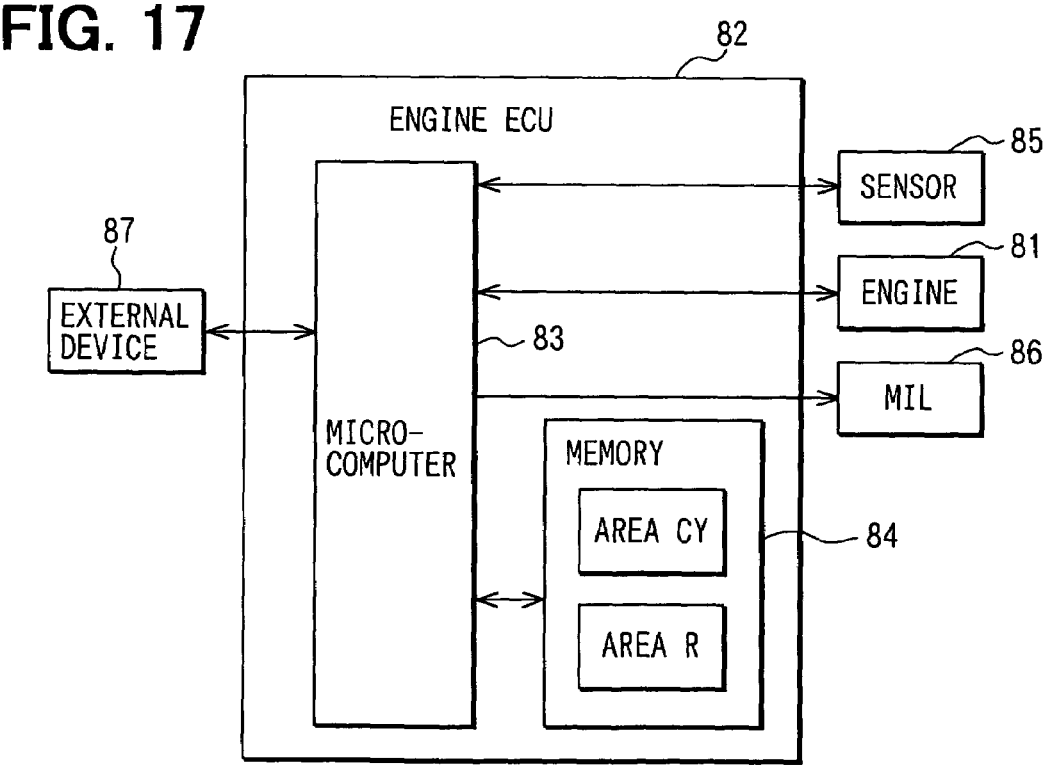
FIG. 17 is a block diagram showing an evaluation system for a fault diagnosis apparatus according to an eighth embodiment of the present invention.

As shown in FIG. 17, a control system of the eighth embodiment has an engine ECU 82. The ECU 82 is connected to an engine 81, sensors 85, a MIL 86, and an external device 87. The ECU 52 has a microcomputer 83 and a memory 84.

The engine 81, the ECU 82, the microcomputer 83, the memory 84, the sensors 85, the MIL 86, and the external device 87 of the eighth embodiment are correspond to the engine 71, the ECU 72, the microcomputer 73, the memory 74, the sensors 75, the MIL 76, and the external device 77 of the seventh embodiment, respectively.

In the eighth embodiment, the memory 84 has the cycle number area CY and the completion number area CO. The cycle number area CY stores the number of the startup (driving cycle). The completion number area CO stores the number of the completion of the failure detection.

Next, operations of the failure diagnosis apparatus according to the sixth embodiment will be explained.

1) Processes when the external device 87 requests.

Figure 18A:
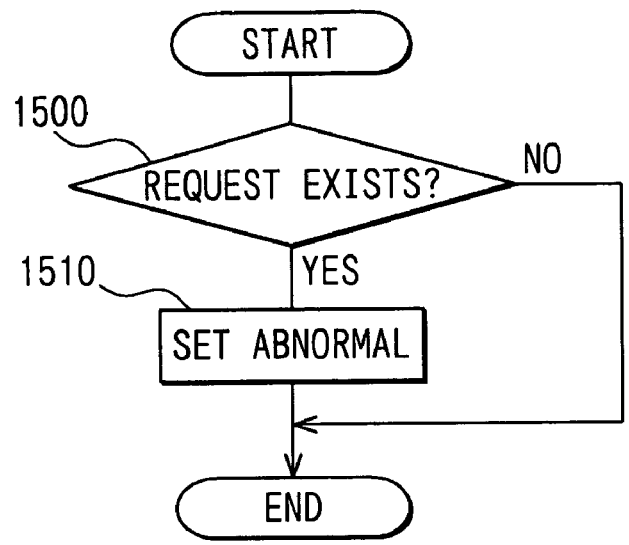
FIG. 18A is a flowchart showing a deletion process according to the eighth embodiment.

As shown in a flowchart of FIG. 18A, in step 1500, it is determined whether the deletion request signal from the external device 87 exists or not. When the deletion request signal exists, the process proceeds to step 1510. Otherwise, when the deletion request signal does not exist, the operation once ends.

In step 1510, since the deletion request signal exists, the numbers of the driving cycle and the determination result of the failure detection are set to "0", simultaneously. Then, the operation once ends.

2) Processes when driving cycle is ended.

Figure 18B:
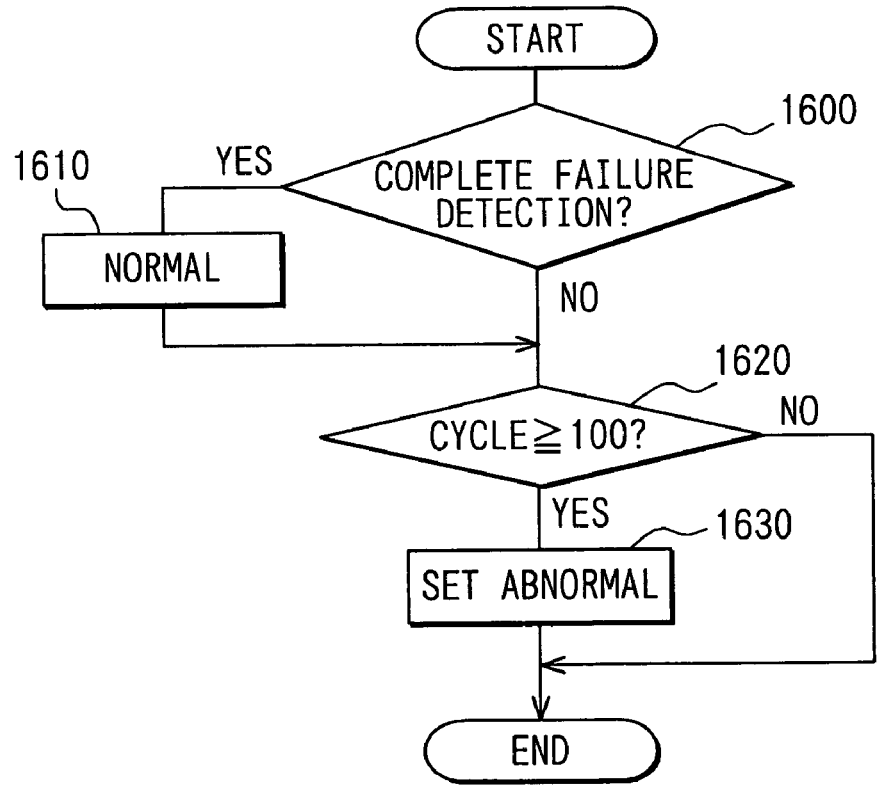
FIG. 18B is a flowchart showing an evaluation process according to the eighth embodiment.

As shown in a flowchart of FIG. 18B, in step 1600, it is determined whether the failure detection is completed at the latest failure detection, that is, at this time of the failure detection. When a judgment is determined to affirmative, the process proceeds to step 1610. Otherwise, when the judgment is determined to negative, the process proceeds to step 1620.

In step 1610, since the failure detection of the sensors 15 is completed at this time of the failure detection, the diagnosis function is determined to in the normal condition. The result area R stores a status data for the normal condition. That is, the result area R stores "1".

In step 1620, it is determined whether the driving cycle is not less than 100 times. When a judgment is determined to affirmative, the process proceeds to step 1630. Otherwise, when the judgment is determined to negative, the process once ends.

In step 1630, since the driving cycle is not less than 100 times, the determination result of the diagnosis function is deleted, that is, the determination result is set "0" (abnormal). Then, the operation once ends.

When the number of the driving cycle is a lot of times, such as not less than 100 times, old data may be remained in the memory 64. Such a situation is not a suitable condition for determining the status of the diagnosis function. Accordingly, in the eighth embodiment, the determination result of the diagnosis function is automatically deleted in a condition that the number of the driving cycle is a lot of times. As a result, the ECU 82 can determine the status of the diagnosis function as appropriate. That is, since the status of the diagnosis function is determined based on relatively new data, it can be determined accurately. Since an operation by the driver is not required to delete the determination result, the control system is relatively convenient for the driver.

In the eighth embodiment, when the number of the driving cycle is not less than 100 times, the determination result is deleted. This means that the ECU 82 regards the diagnosis function as being not operated correctly when the number of the driving cycle is not less than 100 times. In other words, the ECU 82 regards the diagnosis function as being in the abnormal condition when the number of the driving cycle is not less than 100 times.

[Ninth Embodiment]

Figure 19:
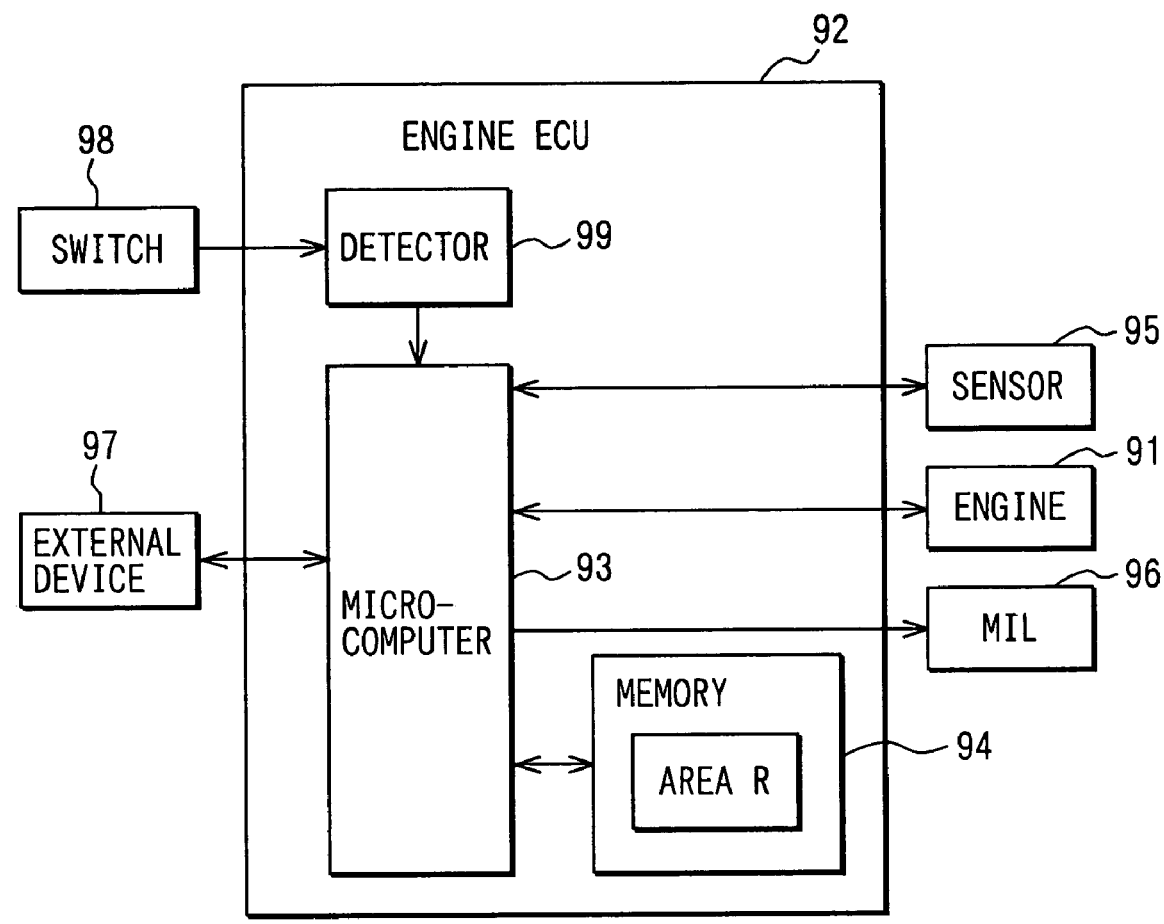
FIG. 19 is a block diagram showing an evaluation system for a fault diagnosis apparatus according to a ninth embodiment of the present invention.

As shown in FIG. 19, in the ninth embodiment, a control system has an engine ECU 92. The ECU 92 is connected to an engine 91, sensors 95, a MIL 96, an external device 97, and a switch 98.

The engine 91, the ECU 92, the microcomputer 93, the memory 94, the sensors 95, the MIL 96, the external device 97, and the switch 98 of the ninth embodiment are correspond to the engine 61, the ECU 62, the microcomputer 63, the memory 64, the sensors 65, the MIL 66, the external device 67, the switch 71 of the seventh embodiment, respectively.

In the ninth embodiment, the memory 94 has the result area R. The result area R stores the determination result that indicates the determination result of the failure diagnosis.

Next, operations of the failure diagnosis apparatus according to the seventh embodiment will be explained.

1) Processes when the switch 98 and the external device 97 requests.

Figure 20A:
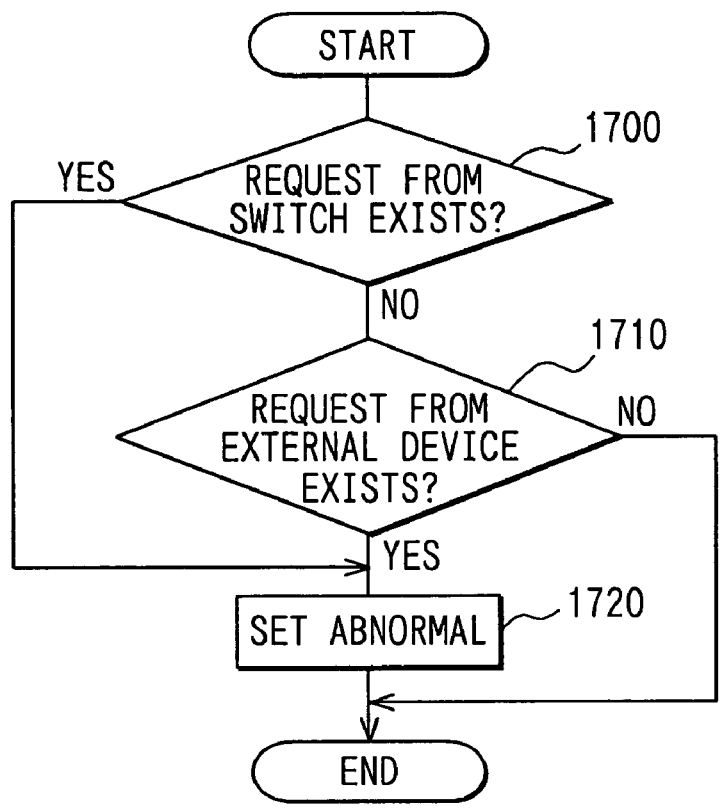
FIG. 20A is a flowchart showing a deletion process according to the ninth embodiment.

As shown in a flowchart of FIG. 20A, in step 1700, it is determined whether the deletion request signal from the switch 98 exists or not. When a judgment is determined to affirmative, that is, the deletion request signal from the switch 98 exists, the process proceeds to step 1720. Otherwise, when the judgment is determined to negative, the process proceeds to step 1710.

In step 1710, it is determined whether the deletion request signal from the external device 97 exists or not. When a judgment is determined to affirmative, that is, the deletion request signal from the external device 97 exists, the process proceeds to step 1720. Otherwise, when the judgment is determined to negative, the process once ends.

In step 1720, since the deletion request signal from the switch 98 or the external device 97 exists, the determination result in the result area R in which the failure diagnosis is determined to in the normal condition or in the abnormal condition is deleted. Then, the operation once ends.

2) Processes when driving cycle is ended.

Figure 20B:
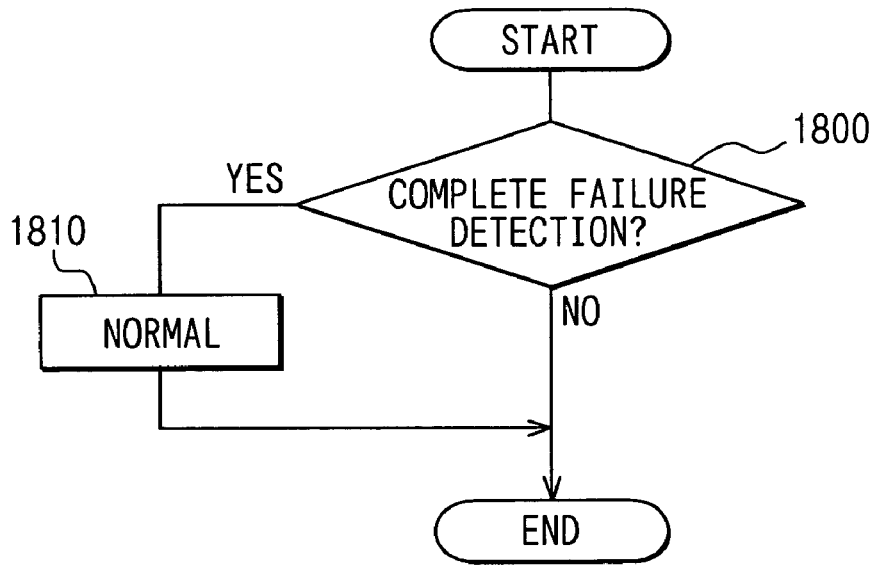
FIG. 20B is a flowchart showing an evaluation process according to the ninth embodiment.
Figure 21:
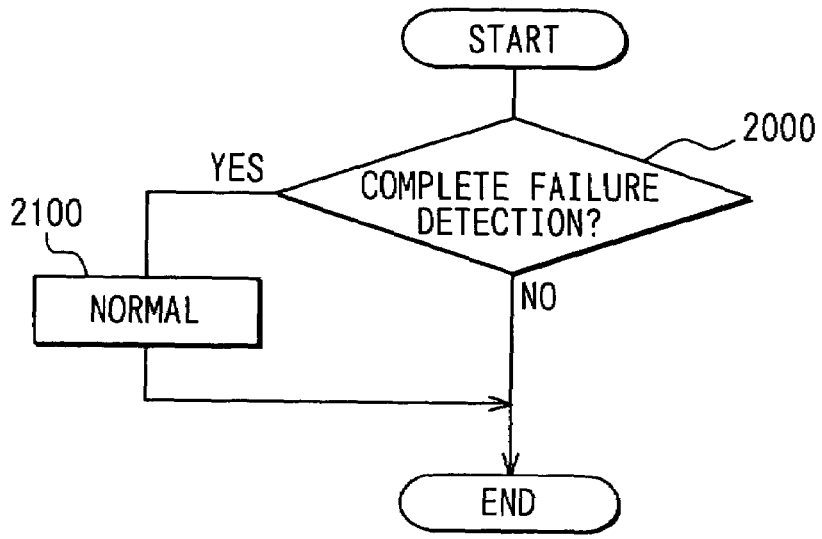
FIG. 21 is a flowchart showing an evaluation process according to a related art.
Figure 22:
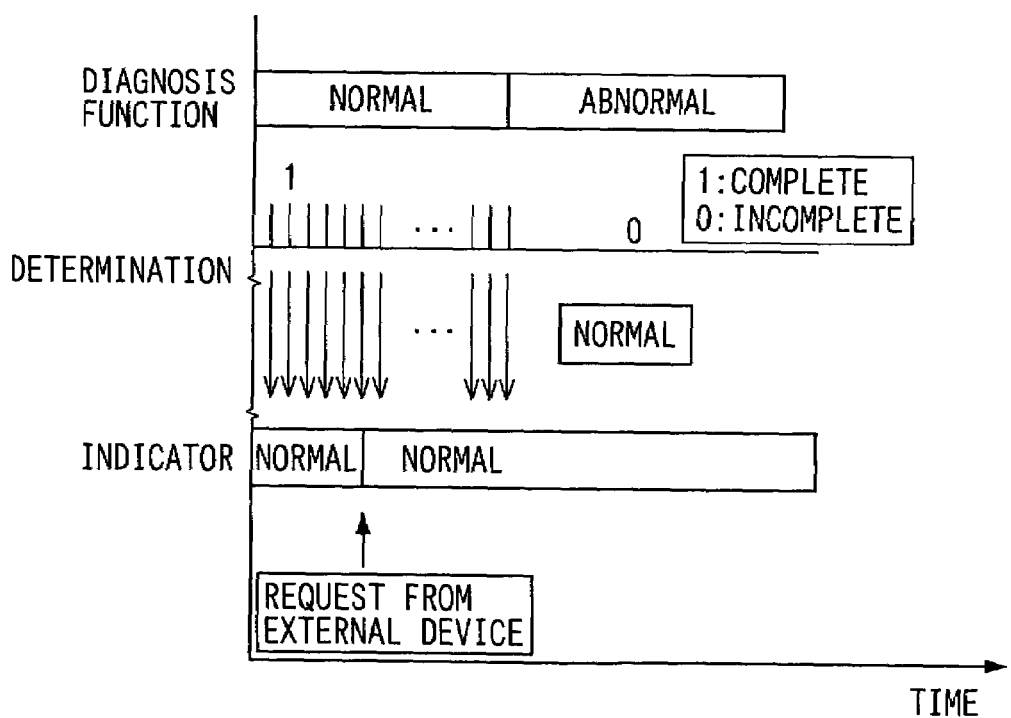
FIG. 22 is a timing chart of the evaluation system according to the related art.

As shown in a flowchart of FIG. 20B, in step 1800, it is determined whether the failure detection is completed at the latest failure detection, that is, at this time of the failure detection. When a judgment is determined to affirmative, the process proceeds to step 1810. Otherwise, when the judgment is determined to negative, the operation once ends.

In the ninth embodiment, it is premised that the determination result is deleted with the operation of the switch 98 by the driver. When the switch 98 is operated by the driver, the determination result in the result area R of the memory 94 is deleted, that is, is set to "0". As a result, the status of the diagnosis function is once set in the abnormal condition, and the MIL 96 shows the abnormal condition of the diagnosis function.

After that, the status of the diagnosis function is determined to in the normal condition or in the abnormal condition in steps 1800, 1810. Accordingly, the ECU 92 can determine the status of the diagnosis function as appropriate.

As a result, when the vehicle is checked at a certain place, such as a gas station, the control system has an advantage in which the determination of the status of the diagnosis function is started from any time.

The present invention should not be limited to the embodiments discussed above and shown in the figures, but may be implemented in various ways without departing from the spirit of the invention. For example, in every embodiment, computer programs shown in the flowcharts, such as FIGS. 2A, 2B, are installed into the ECUs in advance. However, the computer programs may be read from storage media. That is, the computer programs may be stored in the storage media, and then the computer programs may be installed into the determination apparatus. The storage media is an electric control unit, a microchip, a flexible disk, a hard disk drive, and an optical disk. The electric control unit includes a microcomputer. That is, a various kind of storage media is used for storing the computer program.

In addition, the computer programs may be installed from a certain server via communication network, such as the internet, instead of the storage media.

What is claimed is:

1. A diagnosis function evaluation system for evaluating a fault diagnosis function that diagnoses a certain equipment, comprising:
   a completion status determination part that determines whether a diagnosis process of the diagnosis function is completed or not in each of a plurality of times the diagnosis process is performed; and
   a diagnosis function evaluation part that determines that the fault diagnosis function is not in a normal condition when the diagnosis process is not completed a predetermined number of time(s) during the plurality of times the diagnosis process is performed.

2. The diagnosis function evaluation system according to claim 1, wherein the predetermined number is a continuous term.

3. The diagnosis function evaluation system according to claim 1, further comprising: a memory that stores a determination result of the diagnosis function evaluation part.

4. The diagnosis function evaluation system according to claim 3, wherein the determination result is deleted from the memory when the diagnosis function evaluation part determines that the fault diagnosis function is not in the normal condition.

5. The diagnosis function evaluation system according to claim 1, further comprising: a notification part that notifies a determination result of the diagnosis function evaluation part.

6. The diagnosis function evaluation system according to claim 1, wherein the diagnosis function evaluation part determines that the fault diagnosis function is not in the normal condition when all of the plurality of timings of the diagnosis process are continuously not completed in the plurality of timings of the diagnosis process.

7. A diagnosis function evaluation system for evaluating a fault diagnosis function that diagnoses a certain equipment, comprising:
   a completion status determination part that determines whether a diagnosis process of the diagnosis function is completed or not in each of a plurality of times the diagnosis process is performed;
   a ratio calculation part that calculates at least one of a completion ratio in which the diagnosis process is completed and an incompletion ratio in which the diagnosis process is not completed based on a determination result of the completion status determination part within the plurality of times the diagnosis process is performed; and
   a diagnosis function evaluation part that evaluates the fault diagnosis function based on one of the completion ratio and the incompletion ratio.

8. The diagnosis function evaluation system according to claim 7, wherein the diagnosis function evaluation part does not determine that the fault diagnosis function is in the normal condition one of when the completion ratio is less than a first predetermined value and the incompletion ratio is not less than a second predetermined value.

9. The diagnosis function evaluation system according to claim 7, further comprising:
   a memory that stores a determination result of the diagnosis function evaluation part.

10. The diagnosis function evaluation system according to claim 9, wherein the determination result is deleted from the memory when the diagnosis function evaluation part determines that the fault diagnosis function is not in a normal condition.

11. A diagnosis function evaluation system for evaluating a fault diagnosis function that diagnoses a certain equipment, comprising:
    a completion status determination part that determines a completion status relating to a diagnosis process of the diagnosis function in each of a plurality of times the diagnosis process is performed;
    a status memory that stores the completion status;
    a deletion part that deletes the completion status stored in the status memory in response to a request signal from an external device;
    a ratio calculation part that calculates at least one of a completion ratio in which the diagnosis process is completed and an incompletion ratio in which the diagnosis process is not completed based on determination results of the completion status determination part in the plurality of times the diagnosis process is performed after deleting the completion status stored in the status memory by the deletion part; and a diagnosis function evaluation part that evaluates the fault diagnosis function based on one of the completion ratio and the incompletion ratio.

12. The diagnosis function evaluation system according to claim 11, wherein the diagnosis function evaluation part does not determine that the fault diagnosis function is in a normal condition one of when the completion ratio is less than a first predetermined value and the incompletion ratio is not less than a second predetermined value.

13. The diagnosis function evaluation system according to claim 9, further comprising:

a memory that stores a determination result of the diagnosis function evaluation part.

14. The diagnosis function evaluation system according to claim 13, wherein the determination result is deleted from the memory when the diagnosis function evaluation part determines that the fault diagnosis function is not in a normal condition.

15. A computer program product for evaluating a fault diagnosis function that diagnoses certain equipment, said computer program product having a computer readable medium having a computer readable program code embodied in said medium, said computer readable program code having:

a computer readable program part for causing the computer to determine whether a diagnosis process of the diagnosis function is completed or not in each of a plurality of times the diagnosis process is performed; and a computer readable program part for causing the computer to evaluate the diagnosis function by determining that the fault diagnosis function is not in a normal condition when the diagnosis process is not completed a predetermined number of time(s) during the plurality of times the diagnosis process is performed.

16. A computer readable storage medium readable by a computer, tangibly embodying a program of instructions executable by the computer to perform method steps for evaluating a fault diagnosis function that diagnoses certain equipment, the method steps comprising:

determining whether a diagnosis process of the diagnosis function is completed or not in each of a plurality of times the diagnosis process is performed; and evaluating the diagnosis function by determining that the fault diagnosis function is not in a normal condition when the diagnosis process is not completed a predetermined number of time(s) during the plurality of times the diagnosis process is performed.

17. A diagnosis function evaluation system for evaluating a fault diagnosis function that diagnoses certain equipment, comprising:

a completion status determination part that determines whether a diagnosis process of the diagnosis function is completed or not in each of a plurality of driving cycles; and a diagnosis function evaluation part that determines that the fault diagnosis function is not in a normal condition when the diagnosis process is not completed a predetermined number of cycle(s) during the plurality of driving cycles.

18. The diagnosis function evaluation system according to claim 17, wherein the predetermined driving cycle is a predetermined time period from a previous startup of an engine to a current startup of the engine.

19. The diagnosis function evaluation system according to claim 17, wherein the diagnosis function evaluation part determines that the fault diagnosis function is in a normal condition when the diagnosis process is completed at least once in the plurality of driving cycles.

20. The diagnosis function evaluation system according to claim 17, wherein the predetermined driving cycle is a continuous term.

21. The diagnosis function evaluation system according to claim 17, further comprising:

a memory that stores a determination result of the diagnosis function evaluation part.

22. The diagnosis function evaluation system according to claim 21, wherein the determination result is deleted from the memory when the diagnosis function evaluation part determines that the fault diagnosis function is not in the normal condition.

23. A diagnosis function evaluation system for evaluating a fault diagnosis function that diagnoses certain equipment, comprising:

a completion status determination part that determines whether a diagnosis process of the diagnosis function is completed or not in each of a plurality of driving cycles;

a ratio calculation part that calculates at least one of a completion ratio in which the diagnosis process is completed and an incompletion ratio in which the diagnosis process is not completed based on a determination result of the completion status determination part within the plurality of driving cycles; and a diagnosis function evaluation part that evaluates the fault diagnosis function based on one of the completion ratio and the incompletion ratio.

24. The diagnosis function evaluation system according to claim 23, wherein the diagnosis function evaluation part does not determine that the fault diagnosis function is in the normal condition one of when the completion ratio is less than a first predetermined value and the incompletion ratio is not less than a second predetermined value.

25. The diagnosis function evaluation system according to claim 23, further comprising: a memory that stores a determination result of the diagnosis function evaluation part.

26. The diagnosis function evaluation system according to claim 25, wherein the determination result is deleted from the memory when the diagnosis function evaluation part determines that the fault diagnosis function is not in a normal condition.

27. A computer readable storage medium readable by a computer, tangibly embodying a program of instructions executable by the computer to perform method steps for evaluating a fault diagnosis function that diagnoses certain equipment, the method steps comprising:

determining whether a diagnosis process of the diagnosis function is completed or not in each of a plurality of driving cycles; and evaluating the diagnosis function by determining that the fault diagnosis function is not in a normal condition when the diagnosis process is not completed a predetermined number of cycle(s) during the plurality of driving cycles.

* * * * *